United States Patent
Cok et al.

(10) Patent No.: US 12,437,174 B2
(45) Date of Patent: Oct. 7, 2025

(54) HYBRID DOCUMENTS WITH ELECTRONIC INDICIA

(71) Applicant: X-Celeprint Limited, Dublin (IE)

(72) Inventors: Ronald S. Cok, Rochester, NY (US); Robert R. Rotzoll, Colorado Springs, CO (US)

(73) Assignee: X-Celeprint Limited, Dublin (IE)

( * ) Notice: Subject to any disclaimer, the term of this patent is extended or adjusted under 35 U.S.C. 154(b) by 0 days.

(21) Appl. No.: 16/865,257

(22) Filed: May 1, 2020

(65) Prior Publication Data
US 2021/0342659 A1    Nov. 4, 2021

(51) Int. Cl.
*G06K 19/02* (2006.01)
*G06K 19/07* (2006.01)
*G06K 19/077* (2006.01)

(52) U.S. Cl.
CPC ....... *G06K 19/025* (2013.01); *G06K 19/0713* (2013.01); *G06K 19/07705* (2013.01)

(58) Field of Classification Search
CPC ...... G07F 7/084; G07F 7/0813; G07F 7/0893; G06K 19/025; G06K 19/0713; G06K 19/07705; G07D 7/00; G07D 7/01; G07D 7/004; B42D 25/00; B42D 25/40; B42D 25/355; B42D 25/305; B42D 25/29
See application file for complete search history.

(56) References Cited

U.S. PATENT DOCUMENTS

| | | | |
|---|---|---|---|
| 5,439,840 A * | 8/1995 | Jones, Jr. | H10B 12/31 257/E29.343 |
| 5,633,552 A | 5/1997 | Lee et al. | |

(Continued)

FOREIGN PATENT DOCUMENTS

| | | |
|---|---|---|
| KR | 2009/0061862 A | 6/2009 |
| KR | 2012/0074556 A | 7/2012 |
| WO | WO-2021/219833 A2 | 11/2021 |

OTHER PUBLICATIONS

Micro-Transfer Printing (uTP): Technology Overview. Bower, Chris. http://site.ieee.org/ocs-cpmt/files/2013/06/CPMT_2014.02.11_V1_uTP.pdf Feb. 11, 2014 (Year: 2014).*

(Continued)

*Primary Examiner* — Daniel I Walsh
(74) *Attorney, Agent, or Firm* — Choate, Hall & Stewart LLP; Michael D. Schmitt

(57) ABSTRACT

A hybrid document includes a flexible document having visible markings. One or more light-controlling elements and a controller are embedded in or on the flexible document. The controller is electrically connected to the one or more light-controlling elements to control the one or more light-controlling elements. A power input connection is electrically connected to the controller, or one or more light-controlling elements, or both. A power source can be connected to the power input connection, for example a piezoelectric or photovoltaic power source. In response to applied power, the controller causes the one or more light-controlling elements to emit light. In some embodiments, the controller includes a memory and a value can be stored in the memory and displayed by the light-controlling element (s). In some embodiments, the value can be assigned or varied by a hybrid currency teller machine.

19 Claims, 19 Drawing Sheets

(56) References Cited

U.S. PATENT DOCUMENTS

| | | | |
|---|---|---|---|
| 5,636,270 A | 6/1997 | Davey | |
| 6,078,229 A | 6/2000 | Funada et al. | |
| 6,535,407 B1* | 3/2003 | Zaitsu | H02M 3/33571 |
| | | | 363/19 |
| 6,547,151 B1* | 4/2003 | Baldi | G06K 19/07749 |
| | | | 283/57 |
| 6,566,981 B2 | 5/2003 | Urabe et al. | |
| 6,627,966 B2 | 9/2003 | Jeong et al. | |
| 6,911,708 B2 | 6/2005 | Park | |
| 7,463,117 B2 | 12/2008 | Ohara et al. | |
| 7,982,364 B2 | 7/2011 | Takayama et al. | |
| 8,056,820 B2* | 11/2011 | Camus | B42D 25/355 |
| | | | 235/487 |
| 8,253,536 B2* | 8/2012 | Kaminska | B42D 25/29 |
| | | | 382/214 |
| 8,387,886 B2* | 3/2013 | Tompkin | B42D 25/23 |
| | | | 430/1 |
| 8,618,721 B2 | 12/2013 | Ichikawa et al. | |
| 8,901,802 B1 | 12/2014 | Que | |
| 9,013,272 B2 | 4/2015 | Kaminska et al. | |
| 9,691,873 B2* | 6/2017 | Rogers | H01Q 7/00 |
| 9,997,102 B2* | 6/2018 | Rotzoll | G06K 19/0723 |
| 10,008,483 B2* | 6/2018 | Cok | H10H 20/01 |
| 10,037,985 B2* | 7/2018 | De Winter | H10D 89/10 |
| 10,109,753 B2* | 10/2018 | Bower | H10F 55/255 |
| 10,150,325 B2* | 12/2018 | Cok | G07D 7/12 |
| 10,150,326 B2* | 12/2018 | Cok | G07D 11/30 |
| 10,193,025 B2* | 1/2019 | Bower | H10H 20/841 |
| 10,198,890 B2* | 2/2019 | Rotzoll | G07D 7/12 |
| 10,200,013 B2 | 2/2019 | Bower et al. | |
| 10,217,730 B2 | 2/2019 | Bower et al. | |
| 10,294,131 B2* | 5/2019 | Andelman | C02F 1/4691 |
| 10,339,434 B2 | 7/2019 | Cox | |
| 10,361,677 B2 | 7/2019 | Bower et al. | |
| 10,804,880 B2 | 10/2020 | Cok | |
| 10,839,280 B2 | 11/2020 | Cox | |
| 11,274,035 B2 | 3/2022 | Gul et al. | |
| 2002/0197844 A1* | 12/2002 | Johnson | H01L 23/5227 |
| | | | 257/E21.582 |
| 2005/0150740 A1* | 7/2005 | Finkenzeller | G07D 7/01 |
| | | | 194/207 |
| 2005/0240778 A1* | 10/2005 | Saito | H04W 12/068 |
| | | | 713/186 |
| 2007/0103666 A1* | 5/2007 | Ottens | H01L 21/682 |
| | | | 355/75 |
| 2008/0079333 A1 | 4/2008 | Ulm et al. | |
| 2008/0094775 A1* | 4/2008 | Sneh | H01G 9/055 |
| | | | 29/25.42 |
| 2008/0108171 A1* | 5/2008 | Rogers | H10D 62/8164 |
| | | | 438/455 |
| 2008/0157235 A1* | 7/2008 | Rogers | H05K 1/0283 |
| | | | 257/415 |
| 2009/0002199 A1 | 1/2009 | Lainonen et al. | |
| 2009/0009244 A1* | 1/2009 | Banba | H03F 3/195 |
| | | | 333/32 |
| 2009/0243278 A1* | 10/2009 | Camus | B42D 25/355 |
| | | | 283/72 |
| 2010/0123268 A1* | 5/2010 | Menard | H01L 24/97 |
| | | | 264/293 |
| 2010/0271174 A1* | 10/2010 | Kaminska | B42D 25/29 |
| | | | 235/491 |
| 2010/0317132 A1* | 12/2010 | Rogers | H01L 25/50 |
| | | | 257/E33.059 |
| 2011/0062826 A1 | 3/2011 | Umeki et al. | |
| 2011/0140578 A1 | 6/2011 | Ko et al. | |
| 2011/0221569 A1 | 9/2011 | Hamel et al. | |
| 2012/0038463 A1* | 2/2012 | Kaminska | B42D 25/29 |
| | | | 235/494 |
| 2012/0212101 A1 | 8/2012 | Tabata et al. | |
| 2012/0250002 A1* | 10/2012 | Cronin | A61B 5/1172 |
| | | | 356/71 |
| 2012/0320581 A1* | 12/2012 | Rogers | H01L 24/82 |
| | | | 257/E33.059 |
| 2013/0043767 A1 | 2/2013 | Yamamoto et al. | |
| 2013/0065564 A1 | 3/2013 | Conner et al. | |
| 2013/0082569 A1 | 4/2013 | Hirabayashi et al. | |
| 2013/0140649 A1* | 6/2013 | Rogers | B82Y 10/00 |
| | | | 438/48 |
| 2013/0185201 A1 | 7/2013 | Jain et al. | |
| 2014/0062389 A1 | 3/2014 | Ide et al. | |
| 2014/0097944 A1 | 4/2014 | Fastert et al. | |
| 2014/0300095 A1* | 10/2014 | Tompkin | B42D 25/342 |
| | | | 283/67 |
| 2015/0125829 A1* | 5/2015 | Hyman | B44C 3/046 |
| | | | 434/81 |
| 2015/0141767 A1* | 5/2015 | Rogers | A61B 5/6885 |
| | | | 600/361 |
| 2015/0255701 A1 | 9/2015 | Kobayashi | |
| 2015/0372393 A1* | 12/2015 | Bower | H10D 84/206 |
| | | | 257/532 |
| 2016/0093600 A1* | 3/2016 | Bower | H01L 21/6835 |
| | | | 257/89 |
| 2016/0107472 A1* | 4/2016 | Garcia Juez | B42D 25/351 |
| | | | 250/341.1 |
| 2016/0108581 A1* | 4/2016 | Olmos | D21H 21/40 |
| | | | 219/121.69 |
| 2016/0149555 A1 | 5/2016 | Sarata et al. | |
| 2017/0038408 A1 | 2/2017 | Ha et al. | |
| 2017/0141115 A1* | 5/2017 | Bower | H10D 84/217 |
| 2017/0246899 A1* | 8/2017 | Cok | G07D 7/01 |
| 2017/0249983 A1 | 8/2017 | Park et al. | |
| 2017/0301282 A1* | 10/2017 | Rotzoll | H01L 25/167 |
| 2017/0302336 A1* | 10/2017 | Rotzoll | G06K 19/07705 |
| 2017/0313119 A1* | 11/2017 | Cok | G06K 19/07707 |
| 2017/0345243 A1* | 11/2017 | Rotzoll | G08B 5/36 |
| 2018/0013211 A1 | 1/2018 | Ricci | |
| 2018/0199127 A1 | 7/2018 | Hosoi et al. | |
| 2018/0276678 A1* | 9/2018 | Leobandung | G06F 16/242 |
| 2019/0058242 A1 | 2/2019 | Tabe | |
| 2019/0143737 A1* | 5/2019 | Willner | H02N 2/18 |
| | | | 283/83 |
| 2019/0236427 A1* | 8/2019 | Micali | G06F 21/00 |
| 2020/0076372 A1* | 3/2020 | Schroegendorfer | H04B 1/18 |
| 2020/0296825 A1* | 9/2020 | Ozdoganlar | H01L 23/4985 |
| 2021/0002128 A1 | 1/2021 | Cok et al. | |
| 2021/0135648 A1 | 5/2021 | Trindade et al. | |
| 2021/0135649 A1 | 5/2021 | Trindade et al. | |
| 2021/0169417 A1 | 6/2021 | Burton | |
| 2021/0339552 A1* | 11/2021 | Cok | B42D 25/305 |
| 2021/0342659 A1* | 11/2021 | Cok | B42D 25/305 |
| 2022/0001192 A1 | 1/2022 | Kim | |
| 2022/0005919 A1 | 1/2022 | Li et al. | |
| 2022/0112078 A1 | 4/2022 | Rubino | |
| 2022/0115582 A1 | 4/2022 | Tsuruoka | |
| 2022/0131519 A1 | 4/2022 | Ohnishi et al. | |
| 2022/0146076 A1 | 5/2022 | Bourke, Jr. et al. | |
| 2022/0223781 A1 | 7/2022 | Sadr | |
| 2022/0238790 A1* | 7/2022 | Rotzoll | H10N 30/306 |
| 2022/0285291 A1 | 9/2022 | Trindade et al. | |
| 2022/0344970 A1 | 10/2022 | Affleck et al. | |
| 2023/0055056 A1 | 2/2023 | Suzuki | |
| 2023/0168138 A1 | 6/2023 | Hou et al. | |
| 2023/0351235 A1 | 11/2023 | Clark et al. | |
| 2024/0006674 A1 | 1/2024 | Osada et al. | |
| 2024/0152718 A1 | 5/2024 | Yee et al. | |
| 2024/0153933 A1* | 5/2024 | Cok | G06K 19/07705 |
| 2024/0348228 A1 | 10/2024 | Stolt et al. | |

OTHER PUBLICATIONS

International Search Report, International Application No. PCT/EP2021/061358, 6 pages, (mailed Nov. 18, 2021).

Written Opinion, International Application No. PCT/EP2021/061358, 9 pages, (mailed Nov. 18, 2021).

* cited by examiner

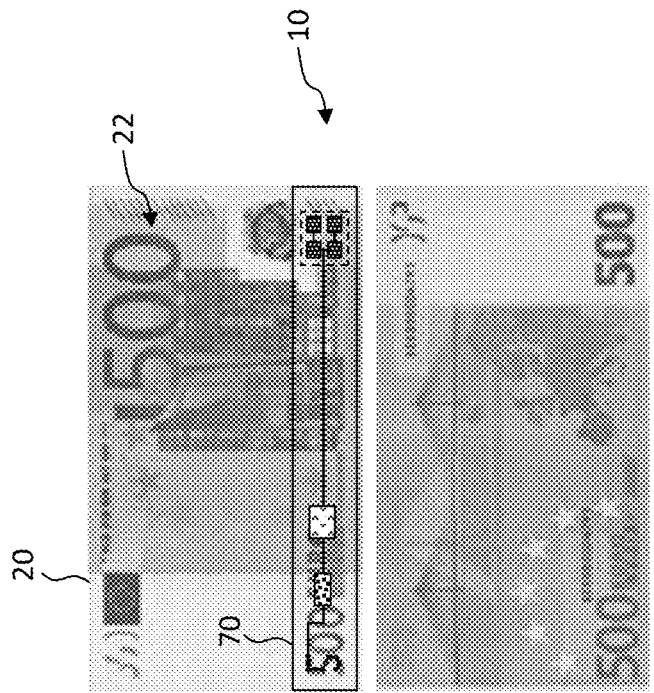
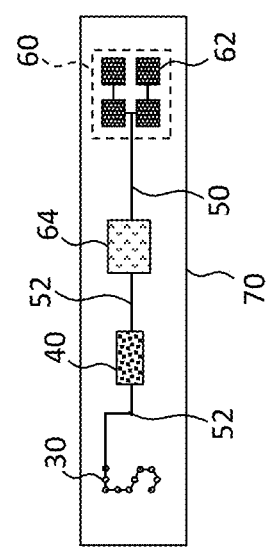
FIG. 3
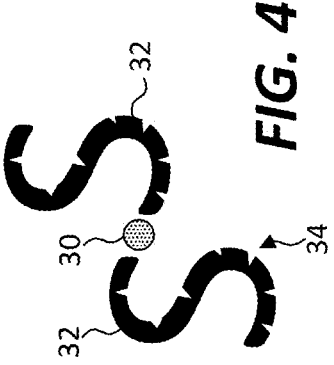
FIG. 2
FIG. 4

HYBRID DOCUMENTS WITH ELECTRONIC INDICIA

CROSS REFERENCE TO RELATED APPLICATIONS

This patent application is related to U.S. patent application Ser. No. 16/181,294 entitled Hybrid Banknote with Electronic Indicia, filed Nov. 5, 2018, which is a continuation of U.S. Pat. No. 10,150,325 entitled Hybrid Banknote with Electronic Indicia, filed Feb. 15, 2016, the disclosure of each of which is hereby incorporated by reference herein in its entirety.

TECHNICAL FIELD

The present disclosure relates to currency and particularly to banknotes having electronically controlled inorganic light-emitting diodes embedded in the banknotes.

BACKGROUND OF THE DISCLOSURE

Monetary instruments issued by governments such as money or currency are used throughout the world today. Government-issued currency typically includes banknotes (also known as paper currency or bills) having visible markings printed on high-quality paper, plastic, or paper impregnated with other materials, such as plastic. The visible markings indicate the denomination (value) of the banknote, includes a serial number, and has decorations such as images, and anti-counterfeiting structures such as special threads, ribbons, and holograms. Currency circulates within an economic system as a medium of monetary exchange having a fixed value until it is physically worn out. Worn out banknotes are generally returned by banks or other financial institutions and then replaced.

Other privately issued monetary instruments are also used, such as credit cards and gift cards. These cards typically include an electronically accessible value (e.g., stored in a magnetic stripe or in a chip in the card) or an electronically accessible account that can be used to make purchases. However, the value of the card is not readily viewed by a user without special equipment, such as a reader.

In the past, banknotes have not been electronically enabled. However, more recently there have been proposals to use RFID (radio-frequency identification device) in banknotes to validate the banknote and avoid counterfeiting. For example, U.S. Pat. Nos. 8,391,688 and 8,791,822 disclose systems for currency validation. U.S. Pat. No. 5,394,969 describes a capacitance-based verification device for a security thread embedded within currency paper to defeat counterfeiting. Security systems for scanning a paper banknote and checking identification information in the banknote (e.g., the serial number) with a network-accessible database have been proposed, for example in U.S. Pat. No. 6,131,718. In all of these systems, however, there is no way to visibly test small details of a banknote without using a separate electronic or optical reader.

There remains a need therefore, for currency providing a variable value that is electronically accessible with visible indicia without using a separate electronic or optical reader.

SUMMARY OF THE DISCLOSURE

The present disclosure provides a hybrid currency banknote having visible markings and one or more light-controlling elements, for example inorganic light-emitting diodes (iLEDs), and a controller embedded in or on the banknote and electrically connected to control the light-controlling elements to emit light. A power input connection is electrically connected to the controller, or one or more light-controlling elements, or both. In a further embodiment, a power source, such as a piezoelectric or photovoltaic device, is electrically connected to the power input connection, with or without a power convertor. In various embodiments, the visible markings include printed images or value indicators. The light-controlling elements can form a graphic indicator such as a number, letter, or pictogram or can highlight a visible marking on the banknote. The light-controlling elements can form a display, for example a monochrome or full-color display.

In one embodiment, the light-controlling elements or controller are printed on the pre-printed banknote. In another embodiment, the light-controlling elements or controller is printed on a ribbon or thread that is subsequently woven or otherwise incorporated into the banknote. The ribbon or thread can also include electrical conductors to electrically connect the controller, the light-controlling elements, and the power source in a circuit. When operated by applying power, the controller controls the light-controlling elements to emit light, for example in a spatial pattern, or in a temporal pattern (for example with flashing lights or sequentially flashing lights), or both. Different light-controlling elements 30 can be activated in response to sequential squeezes of the piezoelectric power source 60.

The currency can also include light pipes (optical waveguides) arranged in association with the light-controlling elements. The light pipes can conduct light to desired locations on the banknote or can form patterns such as graphic indicators. The light pipes can include light-emitting portions, for example diffusers, along the length of the light pipes to emit light at locations along the length of the light pipe as well as at the end of the light pipe.

The controller can include a memory, for example a read-only memory or a write-once memory storing one or more values and the light-controlling elements can be controlled to display numerals corresponding to the values. Multiple values can be stored in a sequential order corresponding to a temporally sequential set of values and can monotonically decline in magnitude. Values stored in the banknote can be electronically read by a teller machine having a reader and the value of the banknote displayed on the teller machine. In a further embodiment, the teller machine can write a value to the banknote using a writer. In an embodiment, the controller controls the written value so that it must be equal to or smaller than a value already stored in the banknote.

A method of making a hybrid currency banknote includes providing a banknote having visible markings, a wafer having a plurality of micro-transfer printable light-controlling elements, and a wafer having a plurality of controllers. One or more of the light-controlling elements and at least one controller are embedded in the banknote, for example by micro-transfer printing onto the banknote or onto a thread or ribbon that is subsequently incorporated into the banknote. The controller is electrically connected to the one or more light-controlling elements and to a power input connection. A power source can also be provided, for example by micro-transfer printing the power source on the banknote or ribbon. An issuer of the hybrid currency banknote can provide a memory with a value or write the value to a memory in the banknote to provide the banknote with a value.

The hybrid currency banknote of the present disclosure can be used by receiving the banknote and providing power to the power input connection, for example by a teller machine that then displays the value of the banknote on the banknote itself or on a display incorporated into the teller machine. Alternatively, the banknote includes a piezoelectric power source and upon squeezing the power source the controller controls the light-controlling elements to emit light. In another embodiment, the banknote includes a photovoltaic power source and upon exposure to electromagnetic radiation (such as infrared or ultraviolet radiation), the controller controls the light-controlling elements to emit light.

A user can insert a received banknote into a teller machine, input an input value to the teller machine, and the teller machine can write a value derived from the input value into the banknote. The input value can represent the value of a monetary transaction, for example a purchase of goods or payment of debt and the difference between the input value and the current value can be written into the hybrid currency banknote.

According to some embodiments of the present disclosure, a hybrid document comprises a flexible document having visible markings and a component embedded in or on the flexible document or in or on a ribbon or thread incorporated into the flexible document. The component comprises a component substrate, one or more relatively rigid inorganic light-emitting diodes disposed on the component substrate, a controller disposed on the component substrate and electrically connected to the one or more inorganic light-emitting diodes for controlling the one or more inorganic light-emitting diodes, and a power input connection electrically connected to (i) the controller, (ii) the one or more inorganic light-emitting diodes, or (iii) both (i) and (ii).

According to some embodiments, the component comprises a power convertor disposed on the component substrate connected to the power input connection and the controller or the one or more inorganic light-emitting diodes to convert the power provided from the power input connection to a form that is used by the controller or the inorganic light-emitting diodes. The power convertor can comprise (but is not limited to) a unitary capacitor, a disaggregated capacitor comprising multiple capacitors electrically connected in parallel, a diode, or any one or combination of these.

The one or more inorganic light-emitting diodes can each comprise a fractured or separated tether, the controller (or power convertor) can comprise a fractured or separated tether, the component or component substrate can comprise a fractured or separated tether, or any one or combination of these. Fractured or separated tethers can be a consequence of micro-transfer printing.

In some embodiments, the power source is provided in the component, for example on the component substrate. In some embodiments, the power source is provided external to the component, for example on the flexible document. The power source can be a photovoltaic power source, an electromagnetic energy harvester, for example comprising an antenna or photodiode or other photosensor, a piezoelectric power source activated by pressure, or a piezoelectric power source activated by movement. The power source or component can be indicated by the visible markings, the power source or component can form a part of the visible markings, or the power source or component can be obscured by the visible markings. In some embodiments, the component is disposed in a location corresponding to a portion of the visible markings to indicate (e.g., highlight) the portion of the visible markings. The controller controls the one or more-inorganic light-emitting diodes to flash or flash sequentially.

In some embodiments, the power source comprises a plurality of electrically connected individual power source components. In some embodiments, the power convertor comprises a plurality of electrically connected individual power convertor components.

The flexible document can be a government-issued banknote indicated by the visible markings. In some embodiments, the hybrid document is a banknote, a bond, a stock certificate, a commercial certificate, a printed value-bearing document, an identification document, or a government-issued document. The flexible document can include a flexible substrate that includes paper, plastic, or impregnated paper, and the component and component substrate can be printed (e.g., micro-transfer printed) on the flexible substrate. In some embodiments, the flexible document comprises a ribbon or thread woven into the flexible document and the component is disposed on the ribbon or thread. The ribbon or thread or portions of the ribbon or thread can be at least partially electrically conductive or include conductive wires.

According to some embodiments, a plurality of components are disposed on the flexible document in a random arrangement or in a regular array. Each of the plurality of components can include a component substrate, one or more relatively rigid inorganic light-emitting diodes disposed on the component substrate, a controller disposed on the component substrate and electrically connected to the one or more inorganic light-emitting diodes for controlling the one or more inorganic light-emitting diodes, and a power input connection electrically connected to (i) the controller, (ii) the one or more inorganic light-emitting diodes, or (iii) both (i) and (ii). In some embodiments, (i) each of the one or more inorganic light-emitting diodes comprises a fractured or separated tether, (ii) the controller comprises a fractured or separated tether, (iii) the component substrate comprises a fractured or separated tether, or (iv) any one or combination of (i), (ii), and (iii)

According to some embodiments of the present disclosure, a method of making a hybrid document comprises providing a flexible document having visible markings, providing a light-emitting diode source wafer having a plurality of relatively rigid printable inorganic light-emitting diodes connected by light-emitting diode tethers to the light-emitting diode source wafer, providing a controller source wafer having at least a portion of a plurality of controllers connected by controller tethers to the controller source wafer, providing a component substrate, and printing at least a portion of at least one or a portion of the plurality of controllers, power convertors, and one or more of the plurality of inorganic light-emitting diodes from the controller source wafer, a power convertor source wafer, and the light-emitting diode source wafer, respectively, to the component substrate, thereby fracturing or separating each light-emitting diode tether that connected the one or more of the plurality of inorganic light-emitting diodes to the light-emitting diode source wafer, each controller tether that connected the at least one of the plurality of controllers to the controller source wafer, and each power convertor tether that connected the at least one of the plurality of power convertors to the power convertor source wafer to provide a component, printing the component in or on the flexible banknote or in or on a ribbon or thread (e.g., thereby embedding the component in or on the flexible banknote or in or on the ribbon or thread), and electrically connecting the at least one of the plurality of controllers to the one or more of the plurality of inorganic light-emitting diodes and to a power input connection. In some embodiments, the power convertor is the controller or the controller is the power convertor in a single device or electrical circuit. Either the power convertor or controller can comprise multiple circuit elements.

In some embodiments, methods of the present disclosure comprise providing a component wafer having relatively rigid component substrates. The relatively rigid component substrates can be connected by component tethers to the component wafer and the method can comprise printing the components after printing the at least one of the plurality of controllers and the one or more of the plurality of inorganic light-emitting diodes to the component substrate.

In some embodiments, the at least one of the plurality of controllers is electrically connected to the one or more of the plurality of light-emitting diodes before the component is printed in or on the flexible banknote or the ribbon or thread. In some embodiments, the at least one of the plurality of controllers is electrically connected to the one or more of the plurality of light-emitting diodes after the component is printed in or on the flexible banknote or the ribbon or thread.

The present disclosure provides an anonymous, government-issued currency with anti-counterfeiting light emitters whose value can be visibly ascertained without requiring specialized equipment and modified electronically.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 2 is a schematic diagram according to an embodiment of the present disclosure;

FIG. 3 is a plan view of the front and back sides of another embodiment of the present disclosure;

FIG. 4 is an illustration of a light pipe according to an embodiment of the present disclosure;

Figure 1:
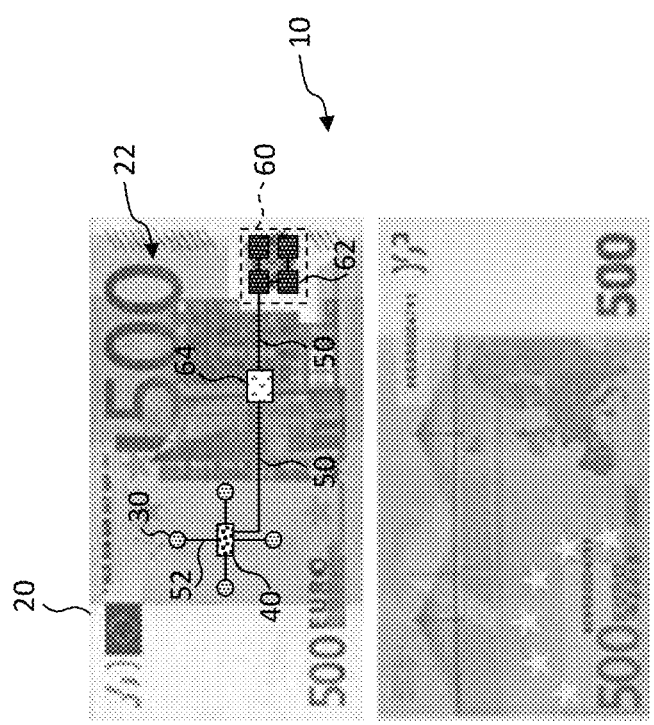
FIG. 1 is a plan view of the front and back sides of an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Referring to FIG. 1, in an embodiment of the present disclosure a hybrid currency banknote 10 includes a banknote 20 having visible markings 22. The banknote 20 can be a government-issued banknote 20 indicated by the visible markings 22 and can comprise a flexible substrate that includes paper, plastic, or impregnated paper. One or more light-controlling elements 30 are embedded in or on the banknote 20 and can be printed on the flexible substrate. A controller 40 is embedded in or on the banknote 20 and electrically connected to the one or more light-controlling elements 30 for controlling the one or more light-controlling elements 30. A power input connection 50 is electrically connected to the controller 40, one or more light-controlling elements 30, or both. In a further embodiment, a power source 60 is electrically connected to the power input connection 50, for example directly to the power input connection 50 (not shown) or through a power convertor 64 (as shown). The power source 60 and the controller 40 can be a common element or a common circuit and the controller 40 can be a power conditioning circuit or can include analog or digital control circuitry. The controller 40, the light-controlling elements 30 and the power input connection 50 can be electrically connected, for example with wires 52. Multiple controllers 40 can be used to provide redundancy, reduce failures, and increase lifetime. The multiple controllers 40 can be connected in parallel with common input, output, power, and ground connections. In other embodiments, the controller 40 can include multiple circuits in multiple integrated circuits and include discrete components, such as capacitors and resistors that can provide additional control support, for example as timing or trimming devices to support light-controlling element 30 flash rates, filter devices such as acoustic wave devices (either bulk or surface).

The power source 60 can be a piezoelectric power source or a photovoltaic power source and the power convertor 64 can convert the power provided by the power source 60 to a form that is used by the controller 40, the light-controlling elements 30, or both. The power convertor 64 can include power storage, for example using capacitors such as thin-film capacitors with a high-K dielectric to provide power over a time period. The capacitors can be distributed, for example located among the power components 62. Output diodes can be used to isolate the power source 60 or light-controlling elements 30. In one arrangement, the power source 60 is indicated by the visible markings 22, the power source 60 forms a part of the visible markings 22, or the power source 60 is obscured by the visible markings 22. Multiple power sources 60 and multiple power convertors 64 can be used to provide redundancy.

In an embodiment, the power source 60 comprises a plurality of electrically connected but physically separated individual power components 62. The power components 62 can be arranged in a 2-d array (as shown) or a 1-d array (not shown) and operated by squeezing, waving, or sliding an object across the power components 62. The power components 62 can be a group of elements that are operated at the same time with a single action, for example pressure applied to all of the power components 62 simultaneously. The power components 62 can be electrically arranged in series to achieve a desired voltage or in parallel to achieve a desired current or some combination of series and parallel to achieve the desired power characteristics.

The light-controlling elements light-controlling elements 30 can be inorganic light-emitting diodes 30 such as micro-light-emitting diodes suitable for micro-transfer printing, for example made on a semiconductor wafer adapted to the manufacture of inorganic light-emitting diodes 30. In general, the light-controlling elements 30 can be light-emitting elements, light-reflecting elements, inorganic light-emitting diodes, organic light-emitting diodes, micro-electromechanical reflective elements, reflective electrophoretic elements, or reflective electrochromic display elements. For clarity of exposition, the light-controlling elements 30 of the present disclosure are referred to below as inorganic light-emitting diodes (iLEDs) 30. However, in various embodiments the present disclosure contemplates the use of a corresponding variety of light-controlling elements 30. In another embodiment, the light-controlling elements 30 are also energy harvesting elements (for example silicon photodiodes) and provide power as part of the power source 60.

The controller 40 can also be an integrated circuit, for example a small chiplet, suitable for micro-transfer printing. The controller 40 can include digital circuits or logic (for example CMOS circuits) and power circuits (for example for driving an LED). The controller 40 can include information storage circuits, a state machine, or a stored program machine to implement the desired functionality of the hybrid currency banknote 10. The controller 40 can read or write information such as currency values, process information, respond to input and provide output. The power input connection 50 can be directly connected to the controller 40 (as shown) or to the iLEDs 30, or both. Alternatively, the power input connection 50 can indirectly connect to the controller 40 or the iLEDs 30, or both through the power convertor 64 (not shown). The power input connection 50 can be an electrical conductor, for example small wires 52, and can include power connection pads that, when electrically connected to a power source, (such as a 3.3-volt, 5-volt, or 12-volt power source), provides power to the controller 40 and iLEDs 30 to enable them to function. The power source can be external (not shown) or can be provided by the internal power source 60.

It can be desirable to fold or spindle the hybrid currency banknote 10 of the present disclosure. To facilitate such a manipulation, in an embodiment of the present disclosure, the power source 60 comprises a plurality of electrically connected smaller individual power components 62. A single large power source 60 can be too rigid to readily fold or curve, whereas an arrangement of individual smaller physically separate power components 62 can allow folding between the smaller power components 62, even if the smaller power components 62 themselves are relatively rigid.

In a further embodiment, the iLEDs 30 and controller 40 are too small to be readily visible with the unaided human eye. Furthermore, the iLEDs 30 and controller 40 can be located in areas of the banknote 20 that include visible markings 22 to further obscure the presence of the iLEDs 30 and controller 40, as well as any wires 52. Similarly, the power source 60 or an arrangement of individual smaller power components 62 can be obscured by the visible markings 22. In one embodiment, any of the iLEDs 30, controller 40, wires 52, power source 60, power components 62, or power convertor 64 are marked with visible markings 22. For example, ink can be printed over the iLEDs 30, controller 40, wires 52, power source 60, power components 62, or power convertor 64 to obscure them or otherwise make them a part of the visible markings 22 on the banknote 20. Since the iLEDs 30, controller 40, wires 52, power source 60, power components 62, or power convertor 64 can each be very small, for example having a size in the micron range, they can be effectively invisible to the unaided human eye. For example, the one or more inorganic micro light-emitting diodes 30 or the controller 40 of the hybrid currency banknote 10 can have a width from 2 to 5 μm, 5 to 10 μm, 10 to 20 μm, or 20 to 50 μm, a length from 2 to 5 μm, 5 to 10 μm, 10 to 20 μm, or 20 to 50 μm, or a height from 2 to 5 μm, 4 to 10 μm, 10 to 20 μm, or 20 to 50 μm.

In one embodiment of the present disclosure, the iLEDs 30 and controller 40 are directly printed onto a banknote 20, for example before or after the banknote 20 is printed with ink. In this embodiment, wires 52 can be woven into the banknote 20 in predetermined locations at which the iLEDs 30 and controller 40 are printed before or after the iLEDs 30 and controller 40 are printed. Referring to FIG. 2 in another embodiment, the banknote 20 includes a metalized or metallic ribbon 70 or thread, for example Mylar, with a pattern of electrical conductors or wires 52. The iLEDs 30 and controller 40 are printed, for example micro-transfer printed, onto the ribbon 70 before or after the electrical conductors such as wires 52 are formed, patterned, or impressed into the ribbon 70 to make an electrical circuit. In such an embodiment, the iLEDs 30 and controller 40 can include at least a portion of an LED tether 31 (see FIG. 20, for example), resulting from the fracturing of an LED tether 31 on an iLED source wafer from which the iLEDs 30 and controller 40 originate and that connects the iLEDs 30 and controller 40 to an anchor on the source wafer in the micro-transfer printing process. The ribbon 70 or thread is then incorporated into the banknote 20 to make an embodiment of the hybrid currency banknote 10 of the present disclosure. The power source 60 (and any power components 62), power convertor 64, or power input connection 50 can likewise be formed in the ribbon 70. Alternatively, some components can be on the ribbon 70 and others not on the ribbon 70, in particular the power source 60.

Referring to FIG. 3, in an embodiment the one or more inorganic LEDs 30 are disposed in a location corresponding to a portion of the visible markings 22 to highlight or otherwise indicate the portion of the visible markings 22. For example, the one or more inorganic LEDs 30 can underline or surround a graphic element of the visible markings 22. As shown in FIG. 3, the one or more inorganic LEDs 30 outline the numeral 5. Thus, the one or more inorganic LEDs 30 can be disposed to form a graphic indicator such as any of one or more of a number, a letter, and a pictogram. The graphic indicator can have semantic content, for example indicating a value, a date, or a person.

Referring next to FIG. 4, one or more light pipes 32 are located in association with the one or more inorganic light-emitting diodes 30 to transmit light emitted by the inorganic light-emitting diodes 30 through the light pipes 32 and emit the transmitted light from the opposite end of the light pipe 32. In an embodiment, the light pipes 32 include portions that leak light at desired locations, for example by purposefully forming nicks, scratches, or other forms of light diffusers 34 in the light pipes 32 to allow light to leak from the light pipe 32. Thus, the arrangement of the light pipes 32 can also correspond to a portion of the visible markings 22 to indicate (e.g., highlight) the portion of the visible markings 22, form a graphic indicator, or form any one or all of a number, a letter, and a pictogram to indicate a value, a date, or a person.

Figure 5:
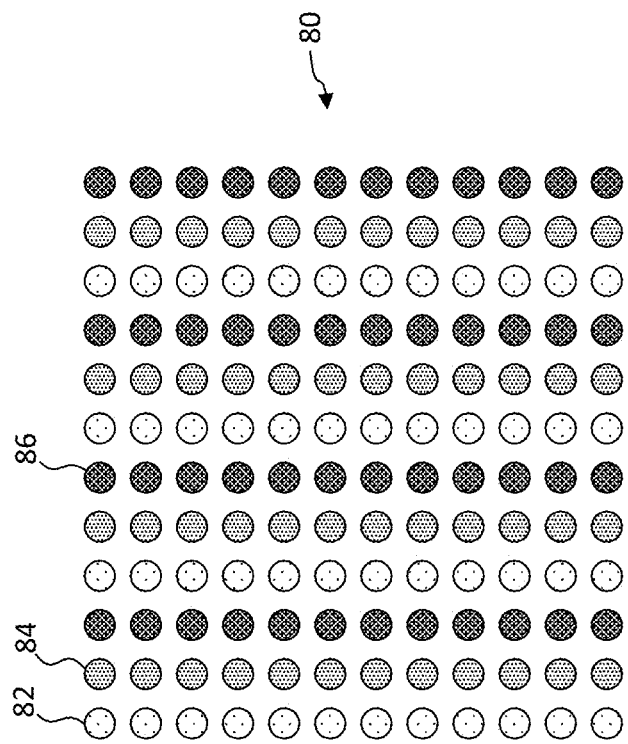
FIG. 5 is a schematic illustration of a display according to an embodiment of the present disclosure.

The controller 40 can control the one or more inorganic light-emitting diodes 30 to flash or sequentially flash individual iLEDs 30, forming spatial, temporal, or temporal-spatial light patterns. Referring to FIG. 5, in an embodiment, the inorganic light-emitting diodes 30 can emit different colors of light. For example, a red light-emitting diode 82 can emit red light, a green light-emitting diode 84 can emit green light, and a blue light-emitting diode 86 can emit blue light. The different inorganic light-emitting diodes 30 can be arranged spatially to form a display 80, a two-dimensional array, or a graphic element.

Figure 6:
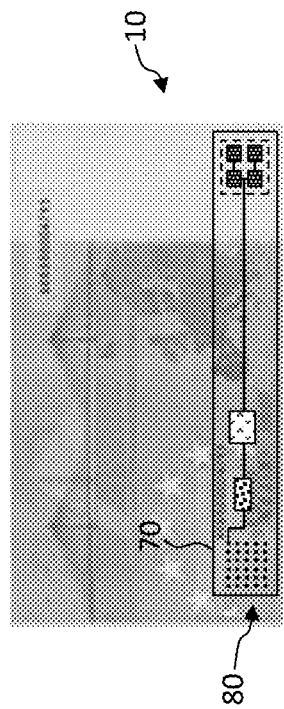
FIG. 6 is a schematic diagram of one side of a hybrid currency banknote according to another embodiment of the present disclosure.
Figure 7:
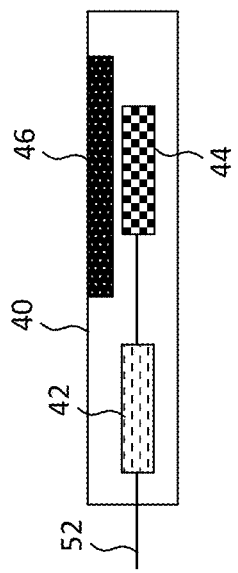
FIG. 7 is a schematic diagram illustrating a controller and circuit according to another embodiment of the present disclosure.

In another embodiment of the present disclosure and referring to FIG. 6, the hybrid currency banknote 10 includes visible markings 22 that do not include a value. Such a hybrid currency banknote 10 can be a non-denominational banknote that either has an assigned value or a variable value stored in a memory 44 in the controller 40, as shown in FIG. 7. Referring to FIG. 7, an assigned value can be provided by providing a circuit 42 and memory 44 in the controller 40 or providing circuits 42, such as the memory 44, connected to the controller 40. The memory 44 can be a read-only memory that encodes a desired assigned value. The assigned value can be a currency value or can include an electronic serial number, or both. The assigned value can be discovered by providing power to the power input connection 50. The power energizes the controller 40 which, in turn, controls the iLEDs 30 to display or otherwise indicate the assigned value. The memory 44 can be protected from overwriting, damage, or alternative discovery by protective layers such as a protective shield 46 formed over the memory 44 to discourage exposure by light and protect the memory 44 from heat. The shield 46 can be a light shield, a light reflector, a light absorber, or a heat conductor.

Figure 9:
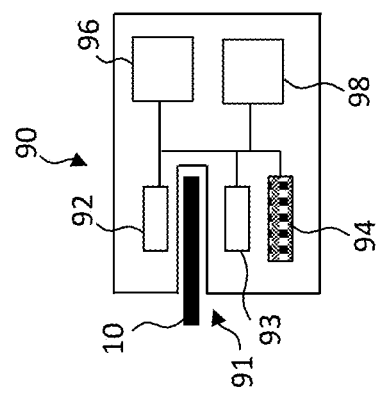
FIG. 9 is a schematic of a teller machine according to an embodiment of the present disclosure.
Figure 8:
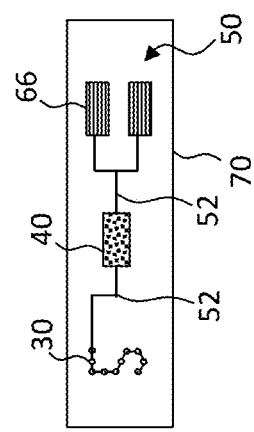
FIG. 8 is a schematic diagram illustrating a circuit according to another embodiment of the present disclosure.

In the case in which the assigned value is variable, the memory 44 can be a write-once memory that stores multiple values in memory locations that are ordered in a sequential order, for example by memory address. The write-once memory can, for example, employ fuses that are electrically destroyed and cannot be rewritten. Alternatively, the memory 44 can be a non-volatile read-write memory. In this case, the value stored by the hybrid currency banknote 10 can change over time. The current value can be discovered by providing power to the power input connection 50. The power energizes the controller 40 which, in turn, controls the iLEDs 30 to display or otherwise indicate the current value. The current value can be modified by, for example, a teller machine. Referring to FIGS. 8 and 9, in an embodiment of the present disclosure, the hybrid currency banknote 10 is adapted to a hybrid currency teller machine 90 that writes a value into the memory 44 in a memory storage location having an address sequentially after the address of a previous written value. As shown in FIG. 8, the power input connection 50 includes or is connected to power connection pads 66 that can be contacted by an external power source to provide power to the controller 40 and iLEDs 30 through wires 52. Referring to FIG. 9, a hybrid currency teller machine 90 includes a slot 91 into which a hybrid currency banknote 10 can be inserted. Once inserted into the hybrid currency teller machine 90, the hybrid currency banknote 10 is read by a reader 92 that can access the controller 40 or memory 44, for example by contacting electrical conductors to the power connection pads 66. (Only two power connection pads 66 are illustrated, but one or more power connection pads 66 can be included in various embodiments of the present disclosure). Once the current value of the hybrid currency banknote 10 is read, it can be displayed, for example on an optional teller machine display 96. If a change in the current value of the hybrid currency banknote 10 is desired, an input value can be input by a user with an input device 94. A teller machine controller 98 can then calculate or otherwise determine a new stored value responsive to the input value and store the new value in the hybrid currency banknote 10, for example by communicating the new stored value to the controller 40 which then writes the new stored value in the memory 44 with a writer 93. In an embodiment, the controller 40 only writes new stored values in the memory 44 that are smaller than the current value. In another embodiment, the controller 40 can write new stored values in the memory 44 that are larger than the current value, or that are larger than the current value but are limited to a maximum value. The change in current value of the hybrid currency banknote 10 can represent or be the result of a financial transaction, for example a purchase or a financial exchange with or facilitated by a financial institution such as a bank. Read-only memories, write-once memories, and read/write memories together with controllers and read/write circuitry (e.g., reader 92 and writer 93) can be formed in integrated circuits and electrical circuits. Devices for currency handling, optical inspection, making physical electronic contacts, displays, input devices (such as keyboards or touch screens) can be made using electromechanical, electronic, and optical technologies.

Figure 10:
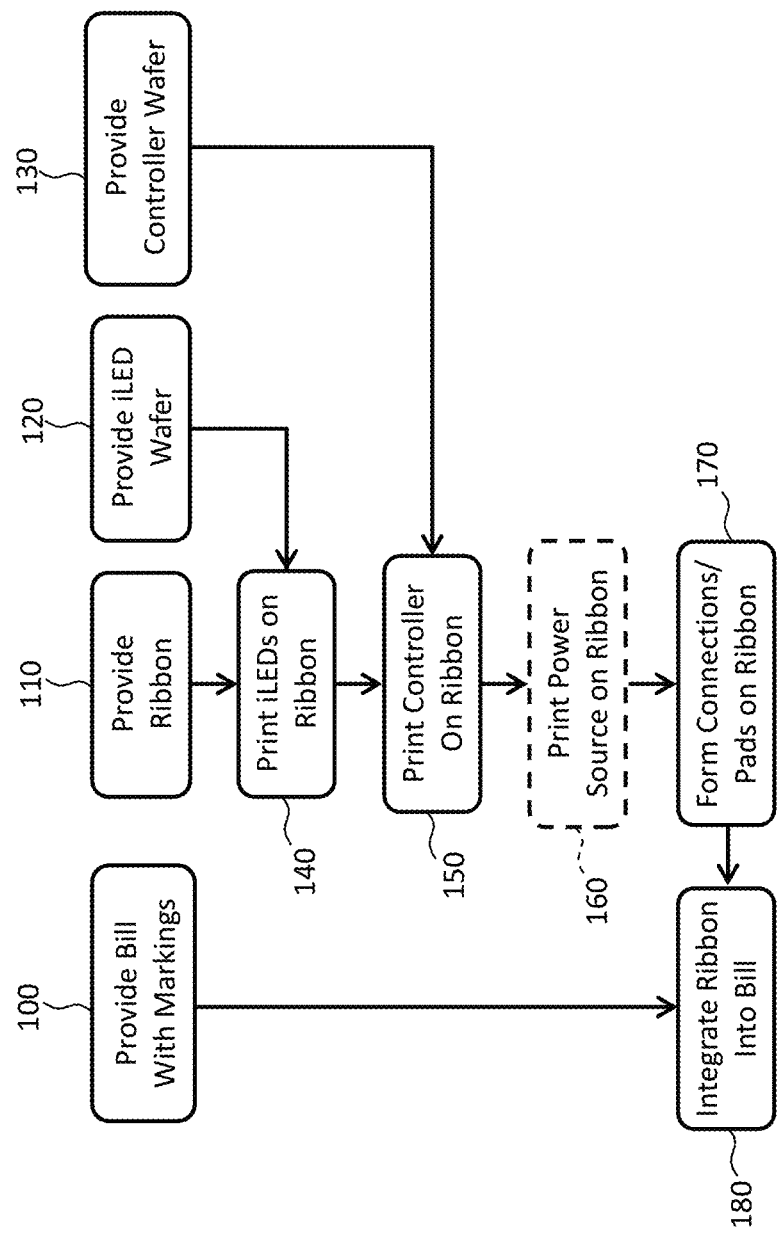
FIGS. 10-12 are flow charts illustrating methods of the present disclosure.

Referring to FIG. 10, a hybrid currency banknote 10 of the present disclosure can be made by providing a banknote 20 with markings in step 100, for example by printing on a high-quality paper with ink using intaglio printing. A ribbon 70 is provided in step 110, an inorganic LED wafer having micro-transfer printable iLEDs 30 is provided in step 120, and a controller source wafer having micro-transfer printable controllers 40 is provided in step 130. The iLEDs 30 are micro-transfer printed from the inorganic LED wafer onto the ribbon 70 using a stamp to fracture LED tethers 31 connecting the iLEDs 30 to the inorganic LED wafer leaving at least a portion of an LED tether 31 on the iLEDs 30 in step 140. The controllers 40 are micro-transfer printed from the controller source wafer onto the ribbon 70 using a stamp to fracture controller tethers 65 connecting the controllers 40 to the controller source wafer leaving at least a portion of a controller tether 65 on the controllers 40 in step 150. Optionally, the power source 60 is similarly micro-transfer printed to the ribbon 70 in step 160. Power connection pads 66, wires 52 and any other necessary electrical conductors are formed in step 170 to make an electronic circuit having electrical conductors. The electrical conductors can be provided before or after the iLEDs 30 and controllers 40 are micro-transfer printed. The ribbon 70 can be further processed, for example to provide environmental robustness by coating with protective layers. The ribbon 70 is then integrated into the banknote 20 in step 180 to make the hybrid currency banknote 10 of the present disclosure. The hybrid currency banknote 10 can be further processed, for example by over coating or printing to provide environmental robustness, decoration, or to obscure the micro-transfer printed elements.

Figure 11:
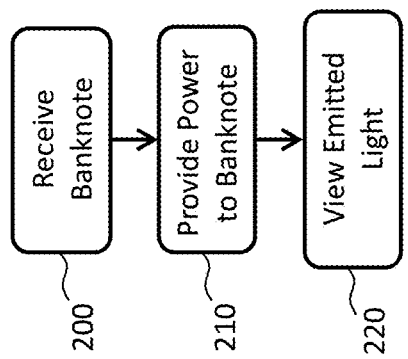

Referring to FIG. 11, the hybrid currency banknote 10 of the present disclosure can be used by first receiving the hybrid currency banknote 10 in step 200, providing power to the hybrid currency banknote 10 in step 210, and viewing light emitted by the hybrid currency banknote 10 in step 220. Power can be provided by connecting the hybrid currency banknote 10 to an external power source (e.g., using the power connection pads 66), squeezing a piezoelectric power source 60, or exposing a photovoltaic power source 60 to light.

Figure 12:
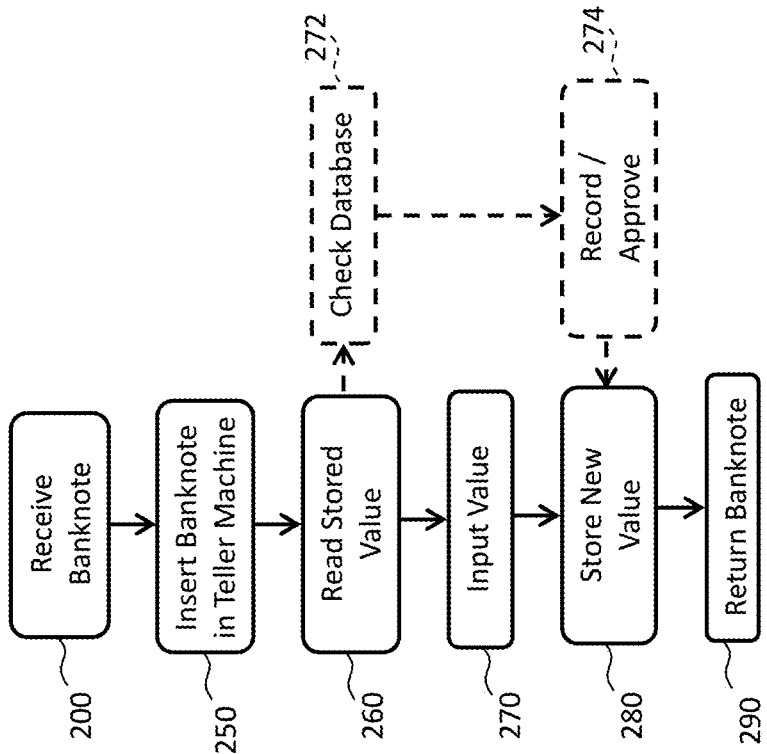

Referring to FIG. 12, an assigned or current value can be programmed into the controller 40 or an associated memory 44 (also micro-transfer printed if it is a separate integrated circuit or chiplet) either before or after the controller 40 or memory 44 is micro-transfer printed. Alternatively, an external device such as a hybrid currency teller machine 90 can communicate with the controller to write an assigned or current value to the hybrid currency banknote 10. For example, the hybrid currency banknote 10 can be received in step 200, inserted into the hybrid currency teller machine 90 in step 250, the current value read by the reader 92 in step 260, an input value input by the input device 94 in step 270, a new stored value responsive to the input value computed by the teller machine controller 98 and stored by the writer 93 in step 280 and the hybrid currency banknote 10 returned in step 290. Optionally, the hybrid currency teller machine 90 can also communicate with a central or remote database (step 272) to establish the legitimacy of the hybrid currency banknote 10, track its use or location, or approve a transaction and record or approve the transaction (step 274). The communication can include an electronic serial number.

U.S. patent application Ser. No. 14/743,981, filed Jun. 18, 2015, entitled Micro Assembled Micro LED Displays and Lighting Elements, incorporated herein by reference describes micro-transfer printing structures and processes useful with the present disclosure. For a discussion of micro-transfer printing techniques see also U.S. Pat. Nos. 8,722,458, 7,622,367 and 8,506,867, each of which is hereby incorporated by reference in its entirety. Micro-transfer printing using compound micro assembly structures and methods can also be used with the present disclosure, for example, as described in U.S. patent application Ser. No. 14/822,868, filed Aug. 10, 2015, entitled Compound Micro Assembly Strategies and Devices, which is hereby incorporated by reference in its entirety.

Figure 13:
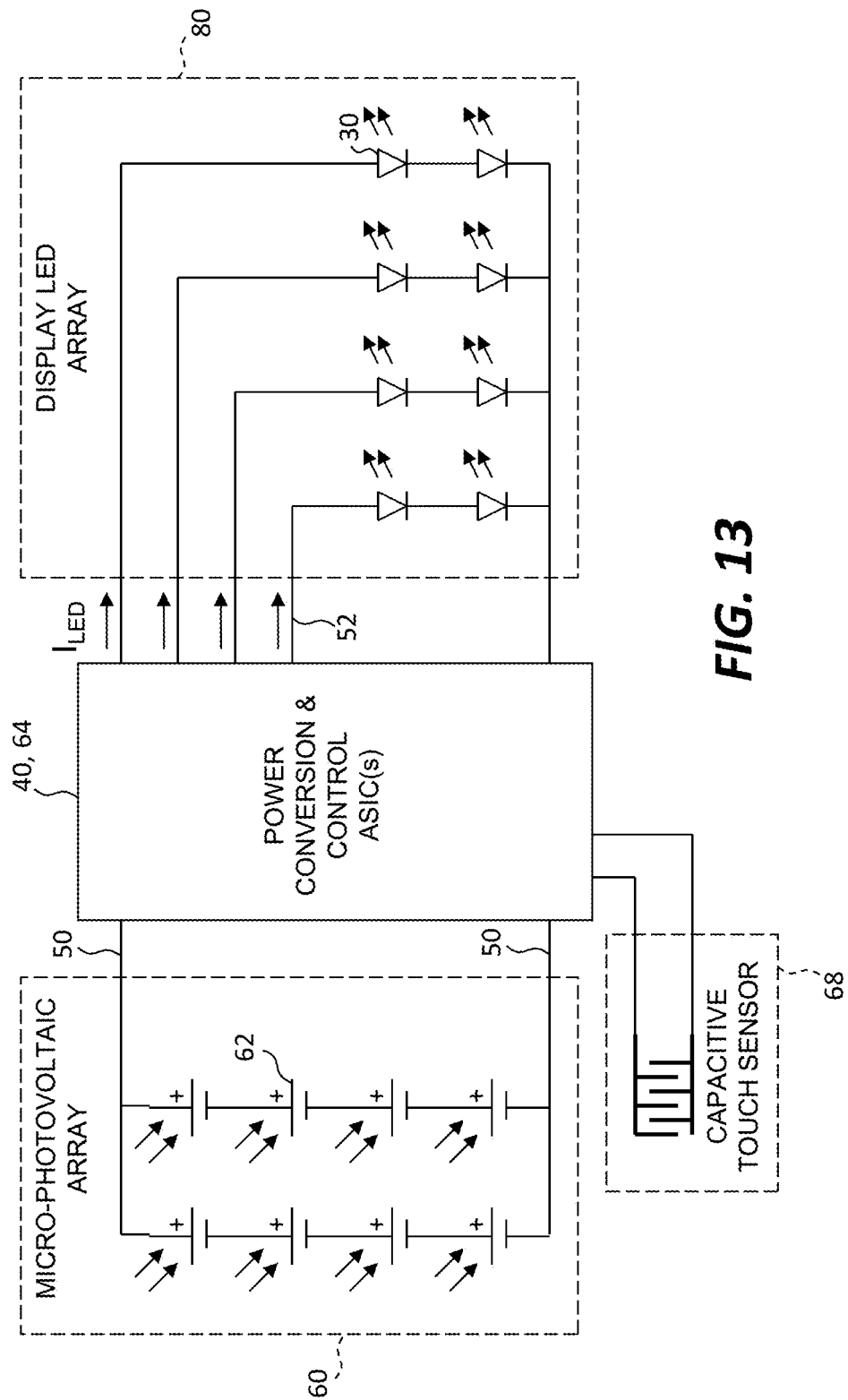
FIGS. 13-15 are schematic diagrams according to embodiments of the present disclosure.
Figure 14:
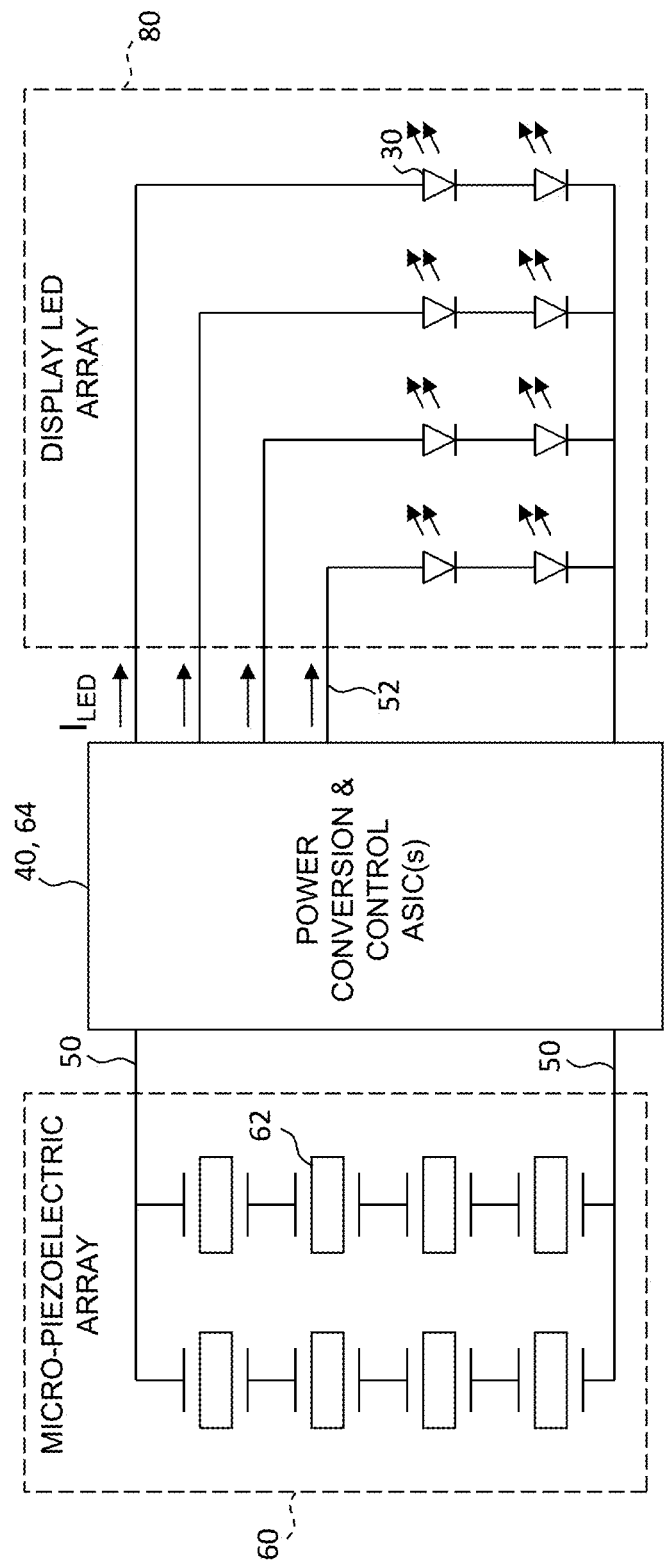
Figure 15:
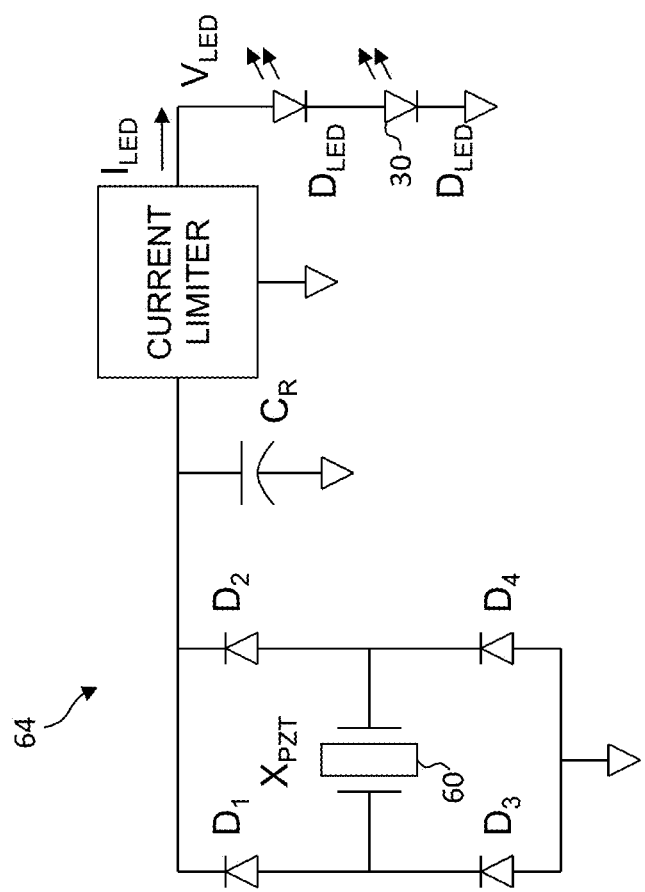

A simplified schematic of an embodiment of the present disclosure is illustrated in FIGS. 13 and 14. As shown in these Figures, a power source 60 includes two parallel groups of four series-connected power components 62 electrically connected to the power input connection 50 and the power convertor 64 and controller 40. The power convertor 64 and controller 40 can be a single component, as shown, or include multiple different components such as separate integrated circuits. Control current from the power convertor 64 and controller 40 drives the iLEDs 30 of the display 80. A capacitive touch sensor 68 is also included (FIG. 13). In FIG. 13, the power source 60 is a photovoltaic power source. In FIG. 14, the power source 60 is a piezoelectric power source. FIG. 15 illustrates an example power convertor 64 and controller 40 having a four-diode bridge rectifier and storage capacitor CR (for example, see capacitor 67 in FIG. 22) providing power from a piezoelectric power source 60 to a current limiter that, in turn, provides current to the iLEDs 30. (The controller 40 can be powered by the power source 60 to control the iLEDs 30 but is not illustrated in FIG. 15. As noted above, the controller 40 and power source 60 can be a common component or circuit or can be separate or individual components or circuits.)

Figure 16:
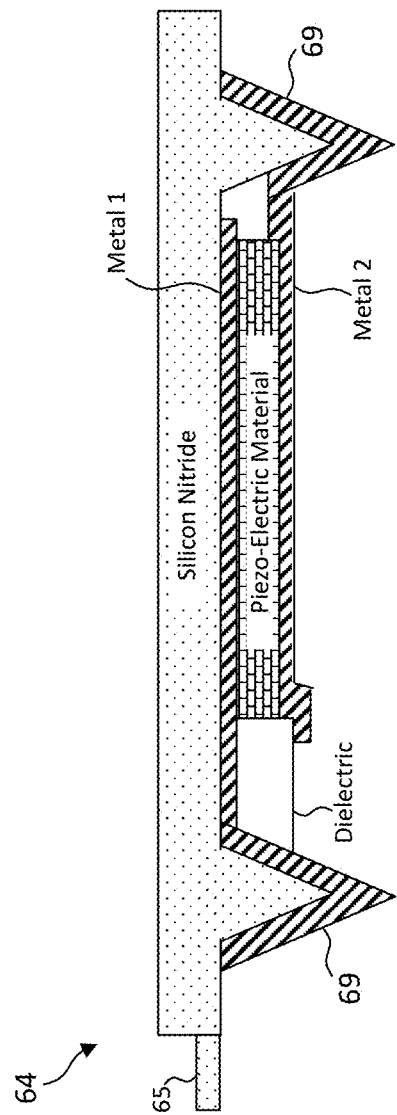
FIG. 16 is a cross section of a piezoelectric power component according to an embodiment of the present disclosure.

Referring to FIG. 16, a power component 64 can include a dielectric layer such as a silicon nitride layer with a first metal layer providing a first connection post 69 or spike. A piezoelectric material layer is in electrical contact with the first metal layer and, on a side of the piezoelectric material layer opposite the first metal layer, a second metal layer is in electrical contact with a second metal layer and forms a second connection post 69 or spike. The power convertor 64 of FIG. 16 can be micro-transfer printed onto two conductors (e.g., wires 52) so that the first and second connection posts 69 are in contact with the conductors. The first and second connection posts 69 can pierce or otherwise deform and adhere to the conductors after micro-transfer printing.

Figure 17:
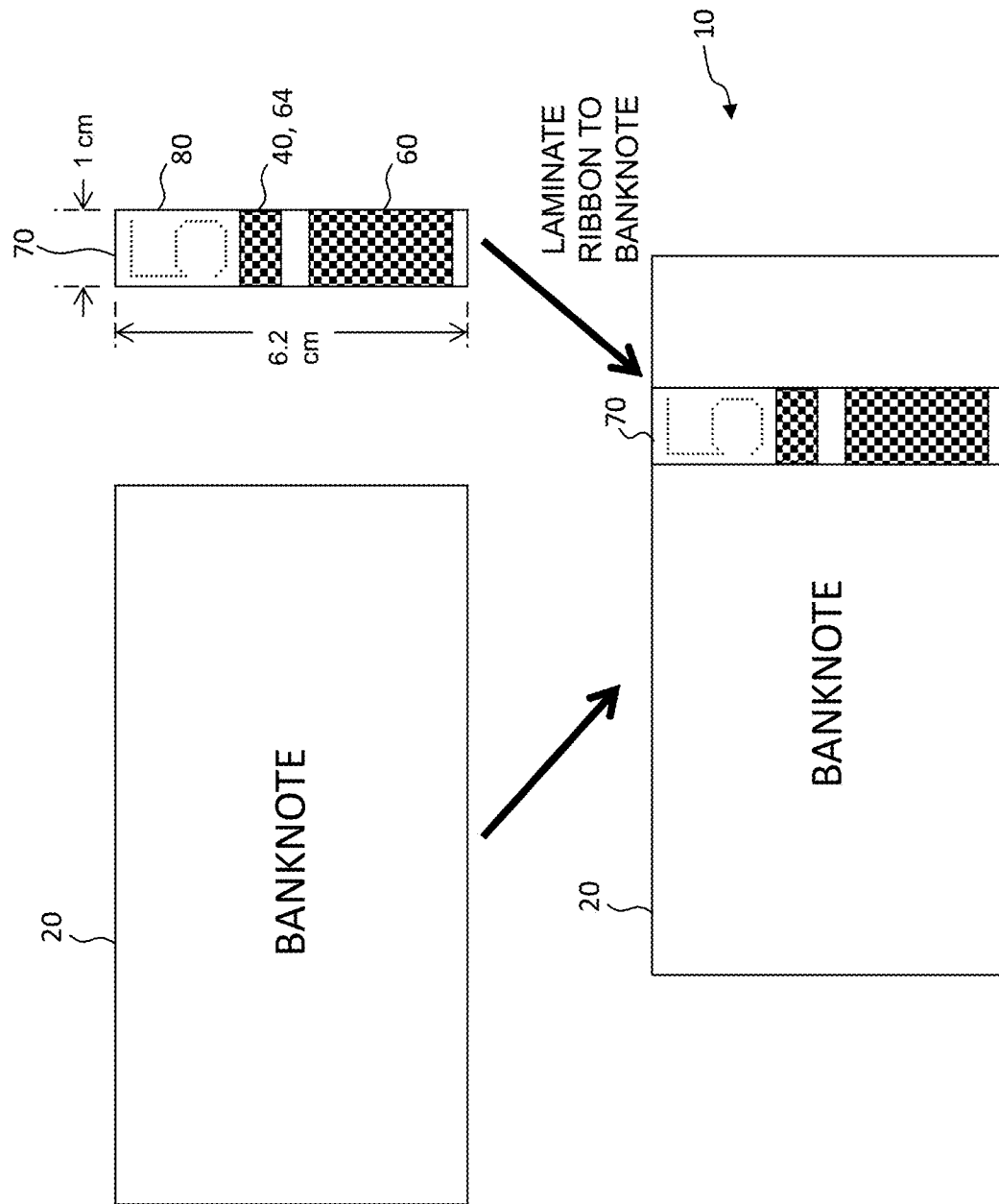
FIG. 17 is a schematic illustration of a method according to an embodiment of the present disclosure.

FIG. 17 illustrates the process of making a banknote 20 according to an embodiment of the present disclosure. A printed banknote is provided together with a ribbon 70 having an array of micro-transfer printed iLEDs 30 electrically connected to a controller, a power convertor 64, and a power source 60. The ribbon 70 is laminated or otherwise integrated into the banknote 20 to make a hybrid currency banknote 10.

Figure 18:
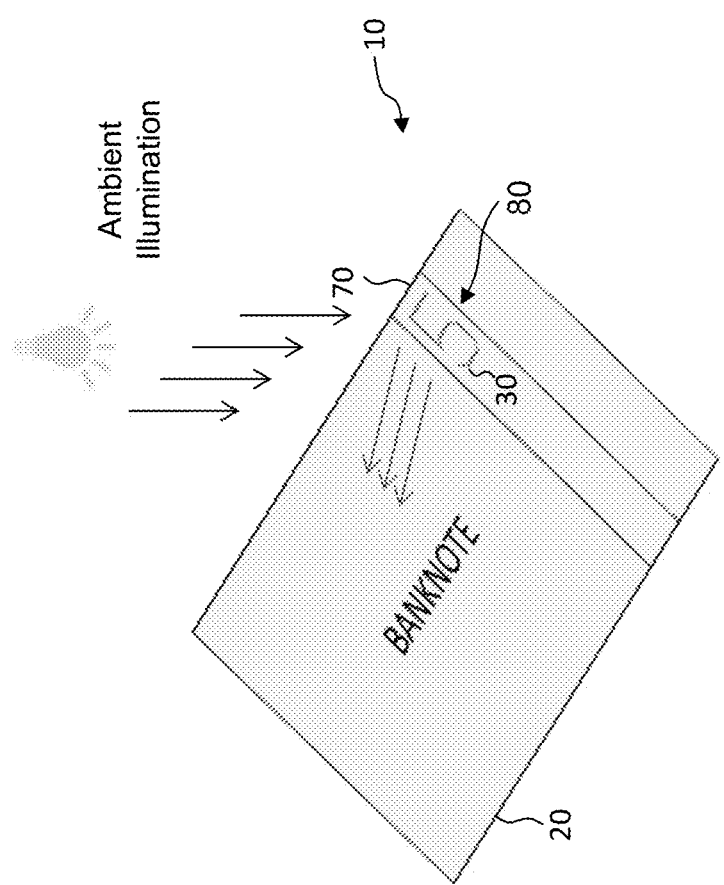
FIGS. 18 and 19 are schematic illustrations of methods of operating an embodiment of the present disclosure.

As shown in FIG. 18, a hybrid currency banknote 10 of the present disclosure having a photovoltaic power source 60 can be exposed to ambient illumination to provide power to iLEDs 30 in a display 80, causing the iLEDs 30 to emit light. It has been calculated that conventional ambient office light provides sufficient illumination (e.g., 500 lux) to operate a photovoltaic embodiment of the present disclosure, including digital control for iLEDs 30 sequencing, for example flashing. Photovoltaic cells (e.g., power components 62) can be GaAs having lateral dimensions of 50µ by 50µ and providing 66 µW in an array of 50,000 power components 62 and requiring approximately 1.27 cm². The array of power components 62 can occupy a larger area with a lower fill factor to provide apparent transparency and improved flexibility to the power source 60. A 20×20 array of 400 iLEDs 30 (for example, green-light-emitting iLEDs 30) can provide a readable display 80 in these conditions over a viewing angle of 140 degrees similar to displays found in body-worn electronic devices (e.g., watches, fitness trackers) and can consume 66 µW.

Figure 19:
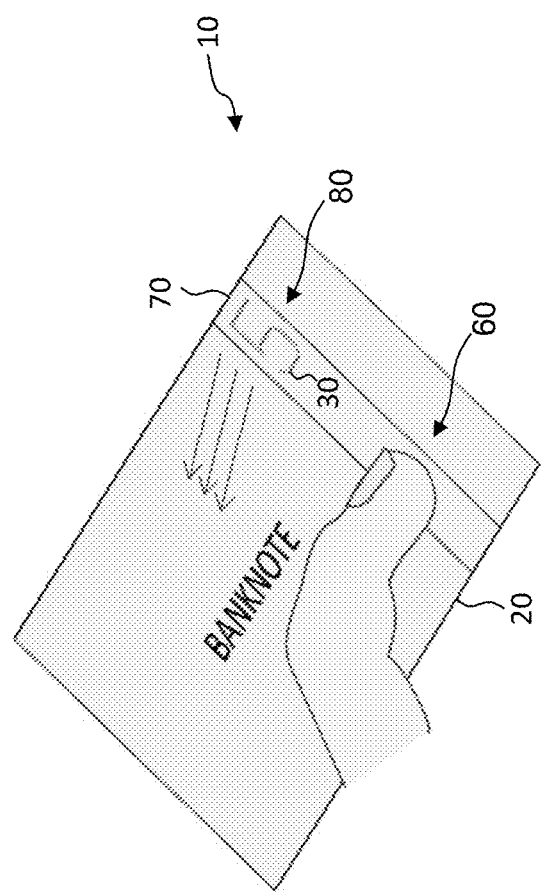

As shown in FIG. 19, a hybrid currency banknote 10 of the present disclosure having a piezoelectric power source 60 can be pressed or squeezed, for example, by a finger, to provide power to iLEDs 30 in a display 80, causing the iLEDs 30 to emit light. Power is provided both when pressing and releasing (hence the use of a bridge rectifier in FIG. 15). It has been demonstrated that a finger tip having a one square cm area can provide a force of 35 N. Even with a smaller force of 10 N, a piezoelectric power source 60 with a total area of 0.06 $cm^2$ provides sufficient power to operate a piezoelectric embodiment of the present disclosure, including digital control for iLEDs 30 sequencing, for example flashing. The array of power components 62 can occupy a larger area (e.g., 0.5 $cm^2$ with a lower fill factor to provide apparent transparency and improved flexibility to the power source 60.

According to another embodiment of the present disclosure, a hybrid currency banknote 10 can have one or more energy output devices embedded in or on hybrid currency banknote 10. The one or more energy output devices can be one or more of one or more light-emitting elements, a sound-emitting element, and a vibration element. The sound-emitting element can be a piezoelectric speaker and the vibration device can be a piezoelectric device. The elements can be controlled, powered, hidden, constructed, or otherwise provided in ways similar to those of the light-emitting elements 30 discussed at greater length above. Such alternative energy output modalities can be useful for persons with impaired vision.

In a further embodiment of the present disclosure, a hybrid document 10 (e.g., a hybrid currency banknote 10) comprises a document 20 having visible markings 22 and one or more light-controlling elements 30 (e.g., inorganic light-emitting diodes 30) embedded in or on document 20 (FIG. 1). A controller 40 is embedded in or on document 20 and is electrically connected to the one or more light-controlling elements 30 for controlling the one or more light-controlling elements 30. The electrical connection can be a wire connection or other methods, such as capacitive alternating current coupling, can be used to control light-controlling element 30. The one or more light-controlling elements 30 can emit or control light of different colors and can be located in a variety of locations in or on documents 20, for example in an array and controlled by controller 40 to display fixed or programmable patterns. A power input connection 50 can be electrically connected to any one or all of controller 40, power convertor 64, circuit 42, memory 44, or the one or more light-controlling elements 30. Controller 40 can control light-controlling elements 30 (e.g., iLEDs 30).

In various embodiments, document 20 is a banknote 20 (as shown in FIG. 1), a bond, a stock certificate, a commercial certificate, a printed value-bearing document, an identification document, or a government-issued document, for example a passport or license. A bond can be a commercial, municipal, or corporate bond, a government-issued bond, or bearer bond, or other debt security.

As with hybrid currency banknote 10 described above, light-controlling elements 30 of hybrid documents 10 can be light-emitting elements, light-reflecting elements, inorganic light-emitting diodes 30, organic light-emitting diodes, micro-electromechanical reflective elements, reflective electrophoretic elements, or reflective electrochromic display elements. In an embodiment of the present disclosure, hybrid document 10 vibrates or emits acoustic signals, such as audible sounds, tones, or sequences of sound, for example in a melody using, for example, polymer piezo films or electrostatic speakers. A hybrid document 10 can include one or more output modes, for example a light-controlling mode or an acoustic mode, or both a light-controlling mode and an acoustic mode.

In some configurations of the present disclosure, a power source 60 can be connected to power input connection 50 of hybrid document 10 (as shown in FIG. 1). Power source 60 can be a piezoelectric power source or a photovoltaic power source, can incorporate MEMs devices, and can be integrated into hybrid document 10. Piezoelectric power source 60 can provide power in response to pressure, as described above, or, in other embodiments, in response to pushing, pulling, stretching, flapping, or waving hybrid document 10 or providing other rapid movement, for example along the longest dimension of hybrid document 10. Power can be provided using IR, UV, visible light, or other electromagnetic radiation to a photovoltaic unit via optical coupling. The electromagnetic radiation can be pulsed or encoded to provide information or signals. The electromagnetic energy source could be ambient light (for example the sun), broadband or narrowband artificial light (for example light bulbs or LEDs of various types), or narrowband high-energy sources, such as LEDs or lasers. In another embodiment, power source 60 is external to hybrid document 10 and power is transmitted to controller 40 or light-controlling elements 30, for example through electrical conductors (e.g., wires 52) in hybrid documents 10. In other configurations, inductive or magnetic coupling is employed to transmit power.

Figure 20:
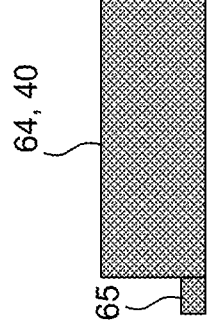
FIG. 20 is a schematic cross section illustration of an inorganic light-emitting diode with an LED tether according to illustrative embodiments of the present disclosure.
Figure 21:
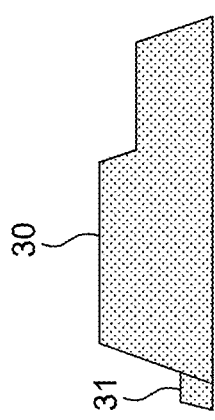
FIG. 21 is a schematic cross section illustration of a convertor or controller, or both with a convertor tether according to illustrative embodiments of the present disclosure.

Inorganic light-emitting diodes (iLEDs) 30 can be horizontal diodes with LED tethers 31, as shown in FIG. 20. Similarly, controller 40 or power convertor 64 can be comprise or be attached to a controller tether 65 or convertor tether 65, as shown in FIG. 21. A fractured or separated tether on or attached to a device indicates that the device was transfer printed (e.g., micro-transfer printed) from a source device wafer. For example, inorganic light-emitting diodes 30 can be micro-transfer printed from an inorganic light-emitting diode source wafer, controller 40 can be micro-transfer printed from a controller source wafer, and power convertor 64 (if distinct from controller 40) can be micro-transfer printed from a power convertor source wafer.

According to some embodiments of the present disclosure, a hybrid currency banknote 10 comprises a flexible banknote 20 (document 20) having visible markings 22 (e.g., as shown in FIG. 1). A component 36 (shown in FIG. 22) is embedded in or on relatively flexible banknote 20 or in or on a ribbon or thread incorporated into flexible banknote 20. Component 36 comprises a component substrate 38 and one or more relatively rigid inorganic light-emitting diodes 30 (rigid compared to flexible banknote 20) disposed on component substrate 38. Component substrate 38 can also be relatively rigid compared to flexible banknote 20. A controller 40 is disposed on component substrate 38 and electrically connected to one or more inorganic light-emitting diodes 30 for controlling the one or more inorganic light-emitting diodes 30. Controller 40 can also be a power convertor 64 or power convertor 64 can be a controller 40. In some embodiments, controller 40 and power convertor 64 are a same device or a common device. A power input connection 50 is electrically connected to controller 40, power convertor 64, the one or more inorganic light-emitting diodes 30, or any combination of these. The one or more inorganic light-emitting diodes 30 each can comprise a fractured or separated LED tether 31, controller 40 can comprise a fractured or separated controller tether 65 (convertor tether 65), component substrate 38 can comprise a fractured or separated component tether 37, or any one or combination of these. Component 36 can be constructed on a component source wafer and then micro-transfer printed from the component source wafer, thereby fracturing or separating component tether 37.

Figure 22:
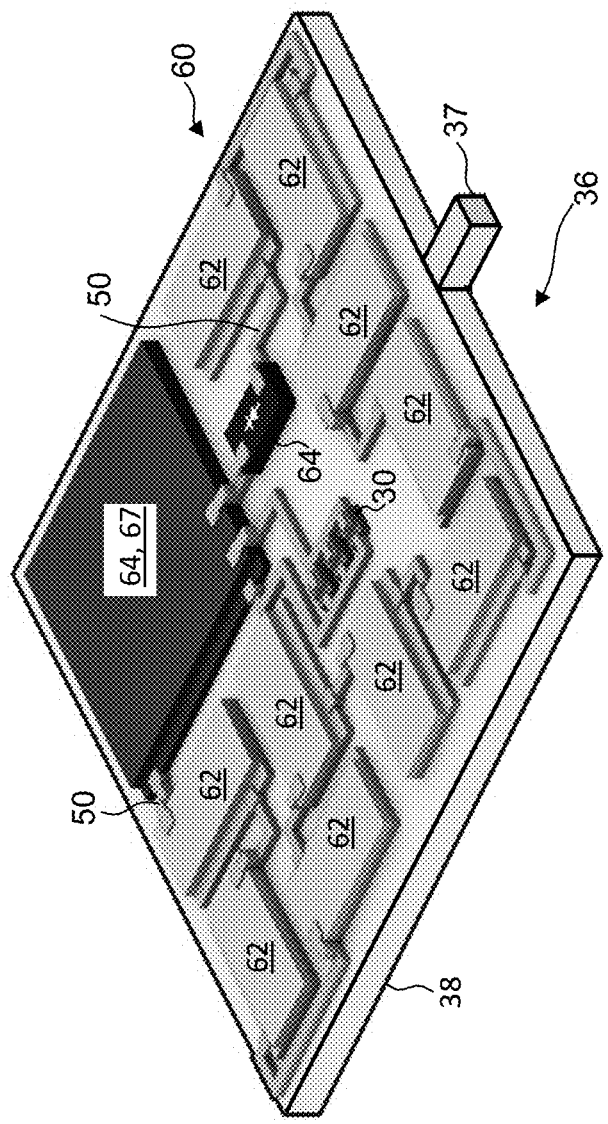
FIG. 22 is a perspective of a component with a component tether according to illustrative embodiments of the present disclosure.
Figure 23:
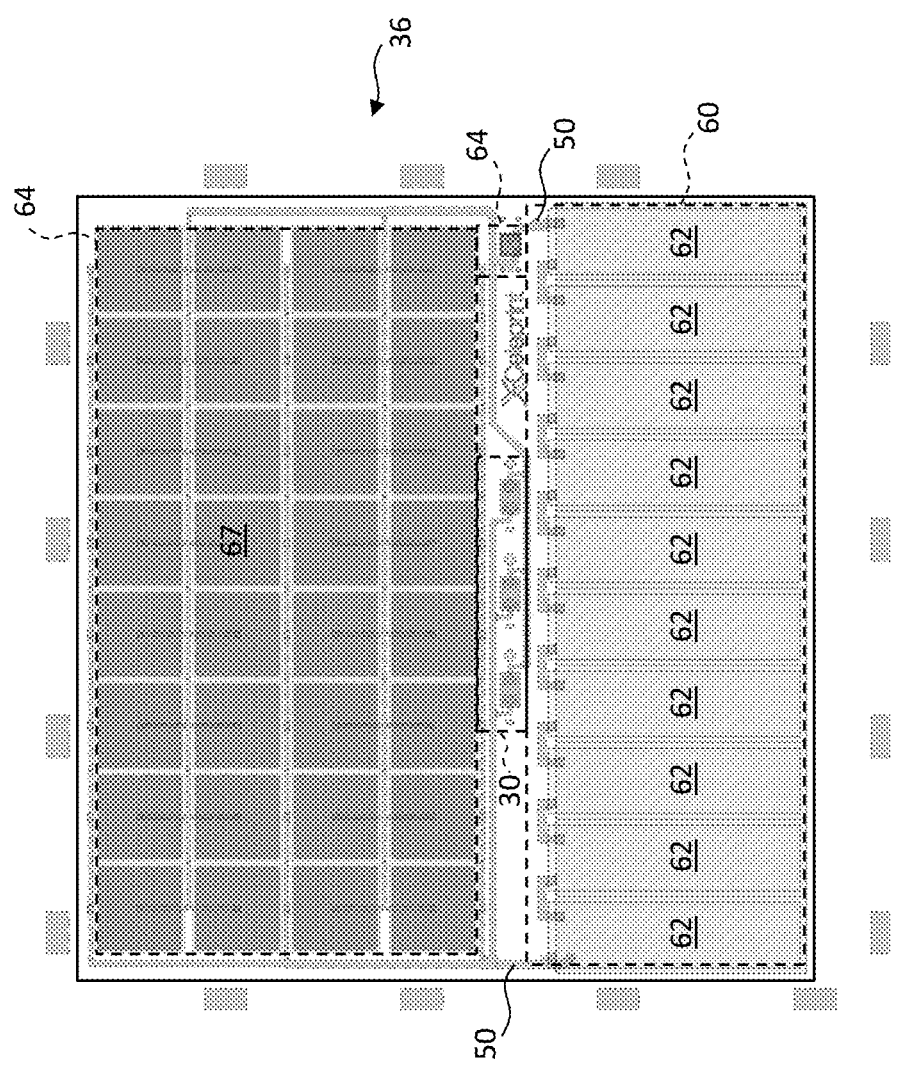
FIG. 23 is a schematic illustration of a component comprising a power source according to illustrative embodiments of the present disclosure.
Figure 24:
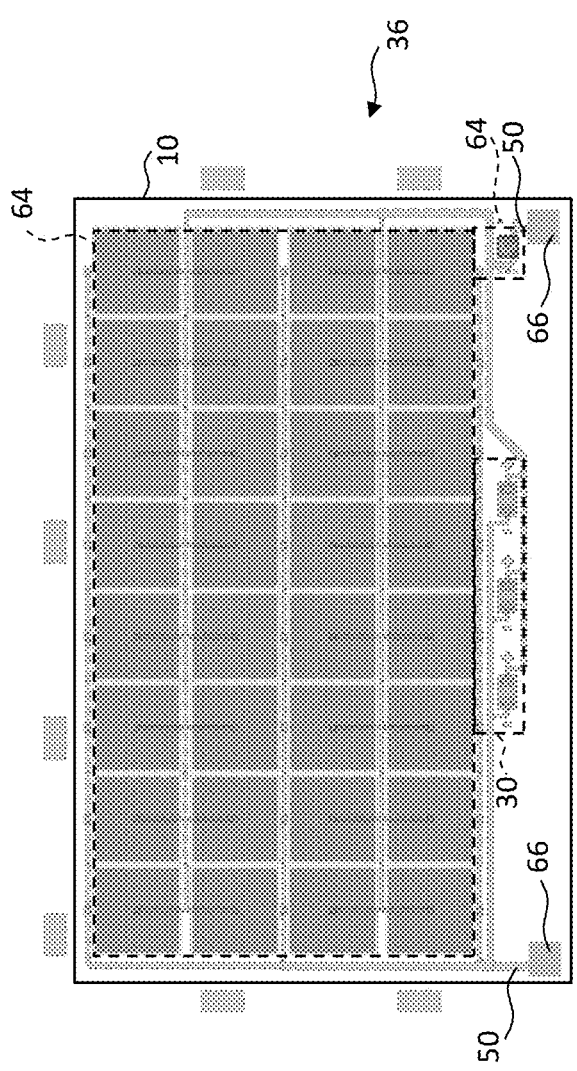
FIG. 24 is a schematic illustration of a component exclusive of a power source according to illustrative embodiments of the present disclosure.
Figure 25:
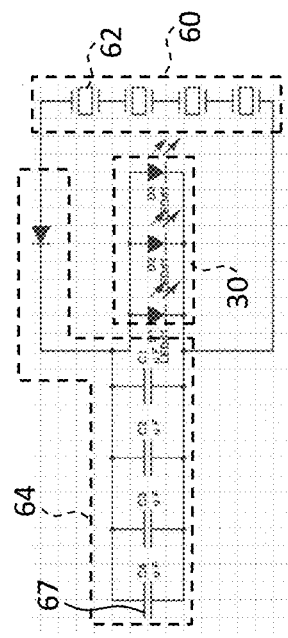
FIG. 25 is an electrical schematic diagram of a power source, convertor, and light-emitting diodes according to illustrative embodiments of the present disclosure.
Figure 27:
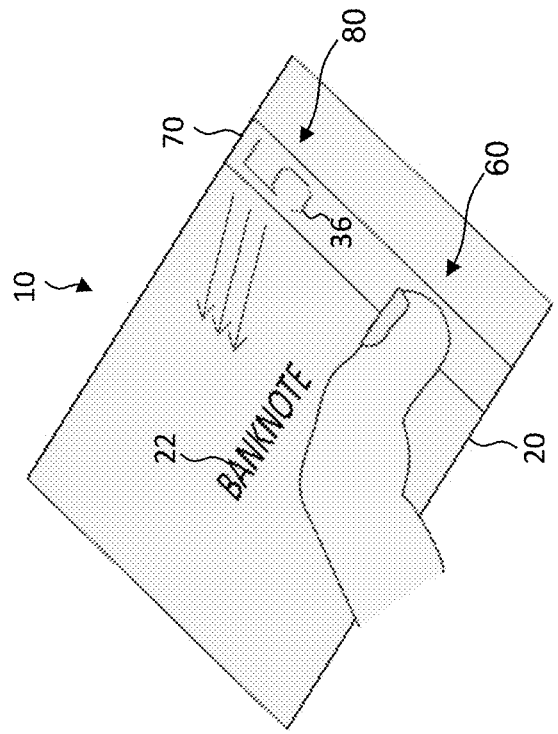
FIG. 27 is a schematic illustration of a hybrid banknote according to illustrative embodiments of the present disclosure.
Figure 26:
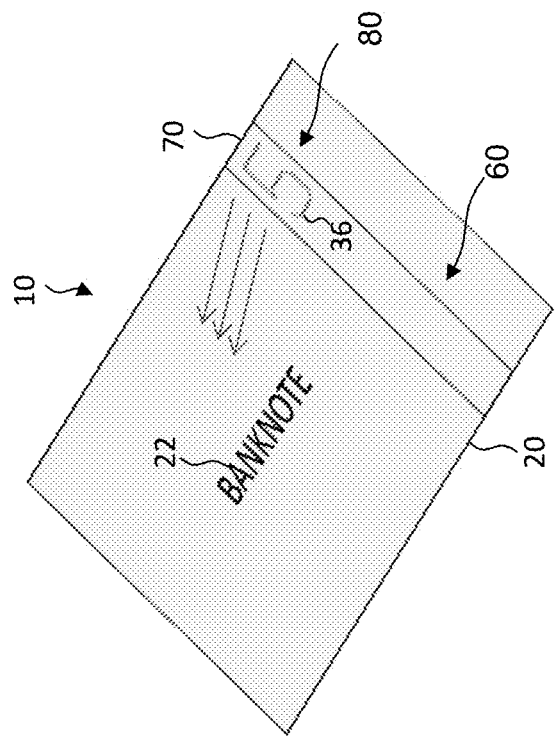
FIG. 26 is a schematic illustration of a hybrid banknote according to illustrative embodiments of the present disclosure.
Figure 28:
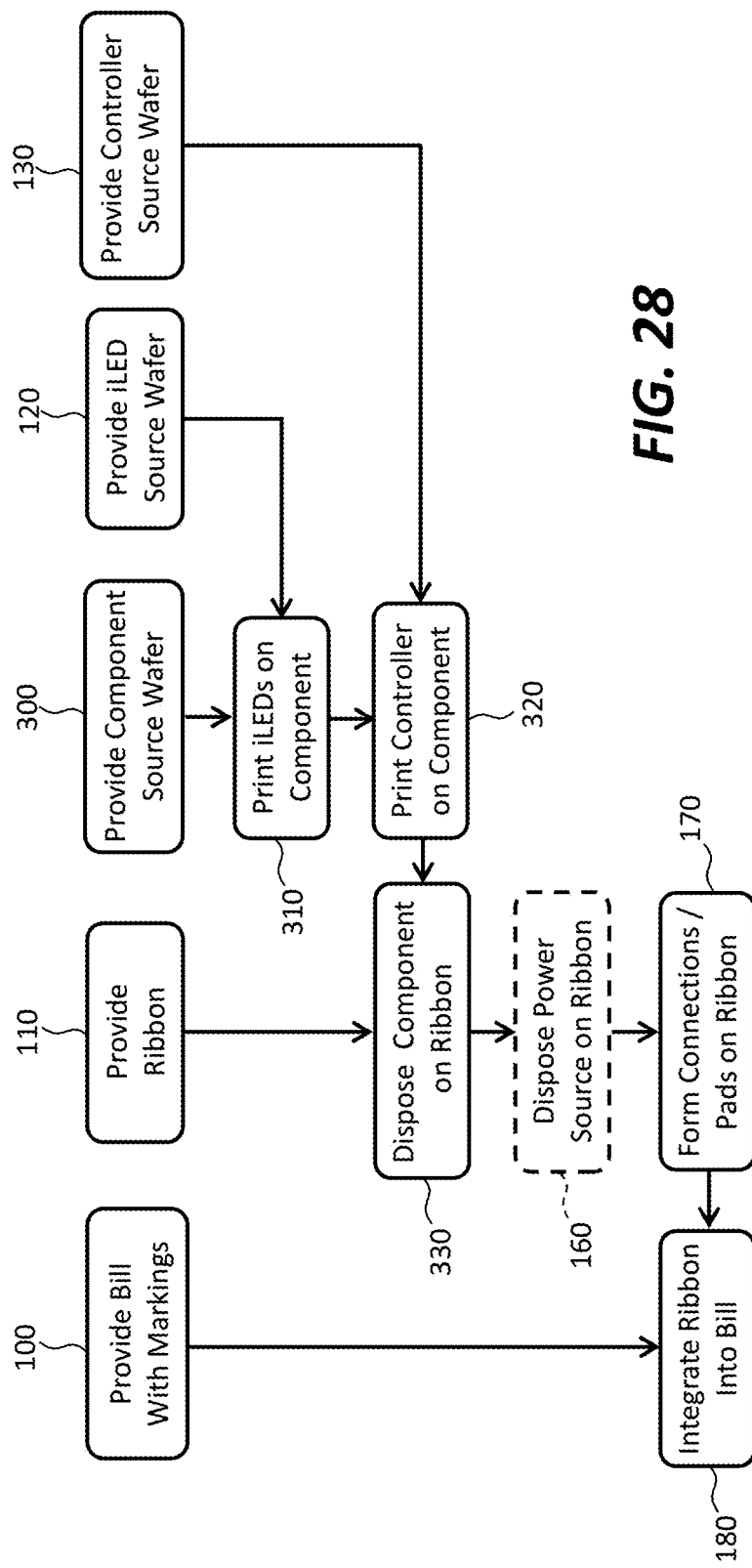
FIGS. 28-29 are flow diagrams of methods according to illustrative embodiments of the present disclosure.

According to embodiments of the present disclosure and as illustrated in FIG. 22, a power source 60 is connected to power input connection 50. Power source 60 can be disposed on component substrate 38, as shown in FIGS. 22 and 23, for example by constructing power source 60 on component substrate 38, e.g., with potassium sodium niobate (KNN), or by micro-transfer printing power source 60 from a power source substrate to component substrate 38. In some embodiments, power source 60 is disposed on flexible banknote 20 external to component substrate 38 (as shown in FIG. 24) and electrically connected to power input connections 50 and component 36, as shown in the electrical diagram of FIG. 25, for example by wires embedded in flexible banknote 20. Power source 60 can be photovoltaic power source, a piezoelectric power source activated by pressure, or a piezoelectric power source activated by movement, for example flapping flexible banknote 20 or bringing ends of flexible banknote 20 near to each other (e.g., as in folding flexible banknote 20 in half) and then separating the ends of flexible banknote 20 from each other to the extent possible, e.g., flattening flexible banknote 20, thereby mechanically moving power source 60. In some embodiments, power source 60 harvests electromagnetic energy and comprises an antenna or a photodiode. Power source 60 or component 36 can be indicated by visible markings 22, power source 60 or component 36 can form a part of visible markings 22, or power source 60 or component 36 can be obscured by visible markings 22. FIG. 26 illustrates embodiments in which power source 60 is provided on component substrate 38 and emits light when power is provided, for example by exposure to electromagnetic radiation or mechanical movement. FIG. 27 illustrates embodiments in which power source 60 is provided on component substrate 38 and emits light when power is provided, for example by exposure to electromagnetic radiation or mechanical movement, for example as disclosed in FIGS. 22 and 23. FIG. 28 illustrates embodiments in which power source 60 is provided external to component substrate 38 and emits light when power is provided, for example by mechanical pressure on flexible banknote 20, for example as disclosed in FIG. 24.

As shown in the perspective of FIG. 22, power source 60 can comprise a plurality of electrically connected individual power components 62. Power components 62 can be electrically connected in series (as shown), in parallel, or in a combination of series and parallel. Component 36 can comprise a power convertor 64 disposed on component substrate 38 and connected to power input connection 50. Power convertor 64 can be electrically connected to controller 40 or one or more inorganic light-emitting diodes 30. In some embodiments, power convertor 64 and controller 40 are a common device or circuit. Power convertor 64 converts the power provided from power input connection 50 from power source 60 to a form that is used by controller 40 (if controller 40 is distinct from power convertor 64) or inorganic light-emitting diodes 30, or both.

In some embodiments of the present disclosure and as shown in FIG. 22, power convertor 64 comprises a unitary capacitor 67. In some embodiments, power convertor 64 comprises a disaggregated capacitor 67 comprising multiple capacitors 67 electrically connected in parallel, as shown in FIGS. 23-25 with 32 individual capacitors 67 each 200 by 200 microns square. In some embodiments, power convertor 64 comprises a diode, as shown in FIG. 22. Thus, in the illustrated embodiments, power convertor 64 or controller 40, can include multiple elements (e.g., a capacitor, multiple capacitors, and a diode) that can be constructed and assembled separately of different materials. For example, capacitor 67 can be constructed on component substrate 38 (e.g., constructed of KNN) and the diode can be micro-transfer printed onto component substrate 38 from a diode source wafer. In some embodiments, power convertor 64 comprises any one or combination of these. A disaggregated structure for power convertor 64 or power source 60 can provide a more mechanically robust structure that can be at least somewhat flexed without cracking. In embodiments illustrated in FIG. 22, power convertor 64 (comprising a capacitor 67 and diode) rectifies and stores charge generated by power source 60 until the charge exceeds the amount needed to pass through three inorganic light-emitting diodes 30, causing the inorganic light-emitting diodes 30 to emit light. The emitted light can flash or flash sequentially. In some embodiments, power source 60 and at least some portions of power convertor 64 are constructed of common materials in common steps, for example using KNN using photolithographic methods and can be formed on component substrate 38 using photolithographic methods and materials.

According to embodiments of the present disclosure, flexible banknote 20 is a government-issued banknote 20 indicated by visible markings 22. Flexible banknote 20 can include or comprise a flexible substrate that includes paper, plastic, or impregnated paper, and component substrate 38 can be transfer printed or otherwise disposed on or in the flexible substrate. In some embodiments, flexible banknote 20 comprises a ribbon or thread woven into flexible banknote 20 and component 36 is disposed on the ribbon or thread. The ribbon or thread or portions of the ribbon or thread can be at least partially electrically conductive or include conductive wires, for example electrically connecting power source 60 to component 36 through power input connections 50. Component 36 can be disposed in a location corresponding to a portion of visible markings 22 to highlight or otherwise indicate the portion of visible markings 22. Some embodiments of the present disclosure comprise a plurality of components 36 disposed on flexible banknote 20 in a random arrangement or in a regular array. Components 36 can form a one-dimensional (e.g., a line), a two-dimensional array (e.g., a display), or form a symbol.

Figure 29:
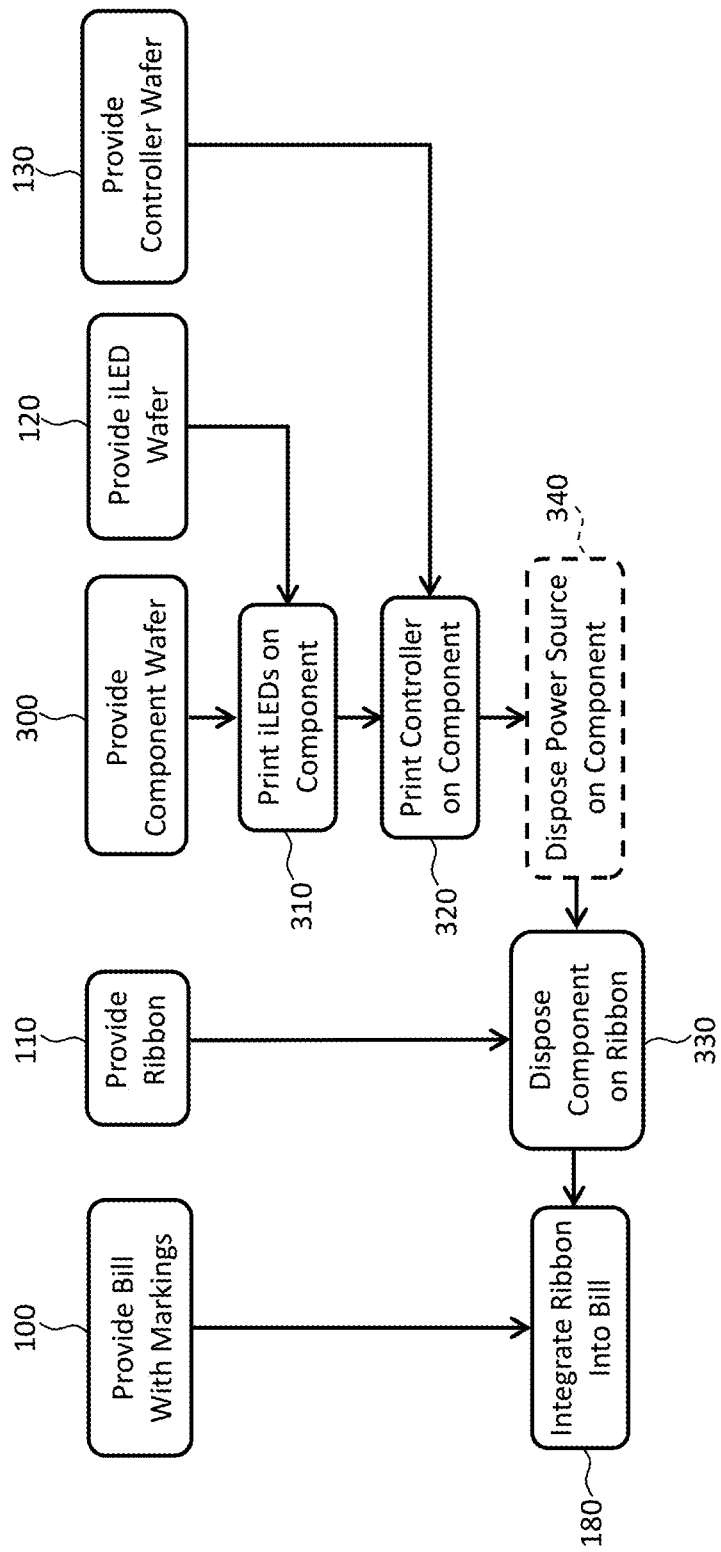

As illustrated in FIGS. 28 and 29, a method of making a hybrid currency banknote 10 comprises providing a flexible banknote 20 having visible markings 22 in step 100, providing a ribbon in step 110, and providing a component source wafer in step 300 comprising relatively rigid component substrates 38 (relative to flexible banknote 20). An inorganic light-emitting diode (iLED) source wafer is provided in step 120. The light-emitting diode source wafer has a plurality of relatively rigid micro-transfer printable inorganic light-emitting diodes 30 connected by LED tethers 31 to the light-emitting diode source wafer. A controller source wafer having a plurality of controllers 40 (or power convertors 64) connected by controller tethers 65 to the controller source wafer is provided in step 130. Controllers 40 on controller source wafer can comprise power convertors 64 or a separate power convertor source wafer can be provided from which power convertors 64 can be transfer printed (generally included in step 130 in FIGS. 28 and 29).

In step 310, iLEDs 30 are micro-transfer printed from the iLED source wafer and controllers 40 (or power convertors 64) are micro-transfer printed from the controller source wafer with a stamp to component substrate 38 in step 320 thereby fracturing or separating each LED tether 31 that connected the one or more of the plurality of inorganic light-emitting diodes 30 to the light-emitting diode source wafer and each controller tether 65 that connected the at least one of the plurality of controllers 40 to the controller source wafer to provide a component 36. In step 330 component 36 is embedded in or on flexible banknote 20 or in or on a ribbon or thread. Controllers 40 (and power convertors 64) are electrically connected to the one or more of the plurality of inorganic light-emitting diodes 30 and to a power input connection 50 in step 160. In embodiments in which power source 60 is provided on flexible banknote 20 external to component substrate 38 and component 36, the electrical connections (step 170) can be made after power source 60 is disposed on the ribbon (in step 160, FIG. 28). In FIG. 29, power source 60 is disposed on or in component 36 (e.g., on component substrate 38) and the electrical connections can be made, for example by photolithographic methods and materials, before disposing component 36 on the ribbon (or flexible banknote 20) in step 330, for example by micro-transfer printing components 36 from the component source wafer onto the ribbon (or flexible banknote 20). Once components 36 are disposed in or on the ribbon, the ribbon can be integrated into flexible banknote 20 in step 180.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

Having described certain embodiments, it will now become apparent to one of skill in the art that other embodiments incorporating the concepts of the disclosure may be used. Therefore, the disclosure should not be limited to the described embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The invention has been described in detail with particular reference to certain embodiments thereof, but it will be understood that variations and modifications can be effected within the spirit and scope of the invention.

PARTS LIST 10 hybrid currency banknote/hybrid document
20 banknote/document/flexible banknote
22 visible markings
30 inorganic light-emitting diode/iLED/light-controlling element
31 LED tether
32 light pipe
34 light leak/diffuser
36 component
37 component tether
38 component substrate
40 controller
42 circuit
44 memory
46 shield
50 power input connection
52 wires
60 power source
62 power component
64 power convertor
65 convertor tether/controller tether
66 power connection pads
67 capacitor
68 capacitive touch sensor
69 connection post
70 ribbon
80 display
82 red inorganic light-emitting diode
84 green inorganic light-emitting diode
86 blue inorganic light-emitting diode
90 hybrid currency teller machine
91 slot
92 reader
93 writer
94 input device
96 optional teller machine display
98 teller machine controller
100 provide banknote with markings step
110 provide ribbon step
120 provide iLED wafer step
130 provide controller source wafer step
140 micro-transfer print iLEDs on ribbon step
150 micro-transfer print controller on ribbon step
160 optional micro-transfer print power source on ribbon step
170 form connections/pads on ribbon step
180 integrate ribbon in banknote step
200 receive banknote step
210 provide power to banknote step
220 view emitted light step
250 insert banknote in teller step
260 read stored value step
270 input value step
280 store new value step
290 return banknote step
300 provide component wafer step
310 print iLEDs on component step
320 print controller on component step
330 dispose component on ribbon step
340 dispose power source on component step

What is claimed:

1. A hybrid document, comprising:
a flexible document having visible markings; and
a component embedded in or on the flexible document, the component comprising:
a component substrate, wherein the component substrate is separate from and more rigid than the flexible document;
one or more inorganic light-emitting diodes separate from the component substrate and that are more rigid than the flexible document disposed on the component substrate, wherein the one or more inorganic light-emitting diodes each comprise a fractured or separated LED tether;
- a controller comprising an integrated circuit separate from the component substrate and that is more rigid than the flexible document disposed on the component substrate and electrically connected to the one or more inorganic light-emitting diodes for controlling the one or more inorganic light-emitting diodes;
- a power input connection disposed on the component substrate and electrically connected to (i) the controller, (ii) the one or more inorganic light-emitting diodes, or (iii) both (i) and (ii);
- a fractured or separated component tether protruding from and attached to a side of the component substrate as a consequence of micro-transfer printing the component to the flexible document;
- a piezoelectric power source activated by pressure or movement that generates charge and has an area no greater than 0.5 cm² disposed on the component substrate and connected to the power input connection; and
- a power convertor to convert the power provided from the power input connection to a form that is used by at least one of the controller and the inorganic light-emitting diodes, the power convertor comprising a capacitor,
- wherein the controller or the one or more light-emitting diodes or both have a length or a width no greater than 50 microns and less than a length or width of the flexible document.

2. The hybrid document of claim 1, wherein the power source is indicated by the visible markings, the power source forms a part of the visible markings, or the power source is obscured by the visible markings.

3. The hybrid document of claim 1, wherein the power source comprises a plurality of electrically connected individual power source components.

4. The hybrid document of claim 1, wherein the power convertor is disposed on the component substrate and connected to the power input connection and at least one of the controller and the one or more inorganic light-emitting diodes.

5. The hybrid document of claim 4, wherein the power convertor comprises (i) a unitary capacitor, (ii) a disaggregated capacitor comprising multiple capacitors electrically connected in parallel, (iii) a diode, or (iv) any one or combination of (i), (ii), and (iii).

6. The hybrid document of claim 5, wherein the power convertor comprises (ii) the disaggregated capacitor and each of the multiple capacitors is 200 microns by 200 microns square.

7. The hybrid document of claim 5, wherein the capacitor is formed or constructed on the component substrate.

8. The hybrid document of claim 1, wherein the flexible banknote is a government-issued banknote indicated by the visible markings.

9. The hybrid document of claim 1, wherein the flexible banknote comprises a flexible substrate that comprises paper, plastic, or impregnated paper, and the component substrate has been printed on the flexible substrate.

10. The hybrid document of claim 1, wherein the flexible banknote comprises a ribbon or thread woven into the flexible banknote and the component is disposed on the ribbon or thread.

11. The hybrid document of claim 10, wherein the ribbon or thread or portions of the ribbon or thread are at least partially electrically conductive or include conductive wires.

12. The hybrid document of claim 1, wherein the component is disposed in a location corresponding to a portion of the visible markings to indicate (e.g., highlight) the portion of the visible markings.

13. The hybrid document of claim 1, wherein the controller controls the one or more-inorganic light-emitting diodes to flash or flash sequentially.

14. The hybrid document of claim 1, comprising a plurality of components disposed on the flexible document in a random arrangement or in a regular array, wherein each of the plurality of components comprises:
- a component substrate, wherein the component substrate is separate from and more rigid than the flexible document;
- one or more inorganic light-emitting diodes separate from the component substrate and that are more rigid than the flexible document disposed on the component substrate;
- a controller comprising an integrated circuit separate from the component substrate and that is more rigid than the flexible document disposed on the component substrate and electrically connected to the one or more inorganic light-emitting diodes for controlling the one or more inorganic light-emitting diodes; and
- a power input connection electrically connected to the controller
- wherein the component substrate comprises a fractured or separated tether and wherein the controller or the one or more light-emitting diodes or both have a length or a width no greater than 50 microns and less than the length or width of the flexible document.

15. The hybrid document of claim 1, wherein the hybrid document is a banknote, a bond, a stock certificate, a commercial certificate, a printed value-bearing document, an identification document, or a government-issued document.

16. A method of making a hybrid document, comprising:
- providing a flexible document having visible markings;
- providing a light-emitting diode source wafer having a plurality of relatively rigid printable inorganic light-emitting diodes connected to the light-emitting diode source wafer by light-emitting diode tethers that protrude from and are attached to a side of the inorganic light-emitting diodes;
- providing a controller source wafer having a plurality of controllers each comprising an integrated circuit that is more rigid than the flexible document connected to the controller source wafer by controller tethers that protrude from and are attached to a side of the controllers;
- providing a component substrate connected to a component source wafer with a component tether protruding from and attached to a side of the component substrate, wherein the component substrate is separate from and more rigid than the flexible document;
- printing at least a portion of at least one of the plurality of controllers and one or more of the plurality of inorganic light-emitting diodes from the controller source wafer and the light-emitting diode source wafer, respectively, to the component substrate, thereby fracturing or separating each light-emitting diode tether that connected the one or more of the plurality of inorganic light-emitting diodes to the light-emitting diode source wafer and each controller tether that connected the at least one of the plurality of controllers to the controller source wafer to provide a component;

disposing on the component substrate (i) a piezoelectric power source activated by pressure or movement that generates charge and has an area no greater than 0.5 cm$^2$ and (ii) a power convertor to convert the power provided from the power input connection to a form that usable by at least one of the controller and the inorganic light-emitting diodes, the power convertor comprising a capacitor;

printing the component in or on the flexible document or in or on a ribbon or thread, thereby embedding the component in or on the flexible document or in or on the ribbon or thread and fracturing or separating the component tether; and electrically connecting the at least one of the plurality of controllers to the one or more of the plurality of inorganic light-emitting diodes and to a power input connection and connecting the power source and the power converter to the power input connection using photolithographic methods and materials, wherein the controller or the one or more light-emitting diodes or both have a length or a width no greater than 50 microns and less than a length or width of the flexible document.

17. The method of claim 16, comprising electrically connecting the at least one of the plurality of controllers to the one or more of the plurality of light-emitting diodes before the component is printed in or on the flexible document or the ribbon or thread.

18. The method of claim 16, comprising electrically connecting the at least one of the plurality of controllers to the one or more of the plurality of light-emitting diodes after the component is printed in or on the flexible document or the ribbon or thread.

19. The method of claim 16, wherein the hybrid document is a banknote, a bond, a stock certificate, a commercial certificate, a printed value-bearing document, an identification document, or a government-issued document.

\* \* \* \* \*